(12) United States Patent
Williams et al.

(10) Patent No.: US 6,226,289 B1
(45) Date of Patent: May 1, 2001

(54) METHOD AND APPARATUS FOR DYNAMICALLY ROUTING CALLS IN AN INTELLIGENT NETWORK

(75) Inventors: L. Lloyd Williams, Kanata; Colin A. Reid, Ottawa; Normand A. Clermont, St. Hubert, all of (CA)

(73) Assignee: Bell Canada, Montreal (CA)

( * ) Notice: Subject to any disclaimer, the term of this patent is extended or adjusted under 35 U.S.C. 154(b) by 0 days.

(21) Appl. No.: 08/939,909

(22) Filed: Sep. 29, 1997

(51) Int. Cl.$^7$ ................................................. H04L 12/50
(52) U.S. Cl. ............................................. 370/385; 370/381
(58) Field of Search ..................... 370/351, 352, 370/522, 384, 385, 381, 382, 383; 379/219, 220, 221, 222, 223, 224, 229, 230, 231, 232, 233, 234, 201, 210, 211, 212; 340/825.03, 827

(56) References Cited

U.S. PATENT DOCUMENTS

| | | | |
|---|---|---|---|
| 4,191,860 | | 3/1980 | Weber . |
| 5,018,191 | * | 5/1991 | Catron et al. . |
| 5,282,244 | | 1/1994 | Fuller et al. ........................ 379/230 |
| 5,519,770 | | 5/1996 | Stein .................................. 379/201 |
| 5,583,926 | | 12/1996 | Venier et al. ...................... 379/207 |
| 5,586,177 | | 12/1996 | Farris et al. ....................... 379/230 |
| 5,602,909 | | 2/1997 | Carkner et al. .................... 379/207 |
| 5,610,977 | | 3/1997 | Williams et al. .................. 379/207 |
| 5,712,903 | * | 1/1998 | Bartholomew et al. ........... 379/201 |
| 5,881,132 | * | 3/1999 | O'brien et al. .................... 379/230 |
| 5,926,754 | * | 7/1999 | Cirelli et al. ...................... 455/414 |
| 5,940,491 | * | 8/1999 | Anderson et al. ................. 379/230 |
| 6,034,972 | * | 3/2000 | Ward et al. ........................ 370/522 |

FOREIGN PATENT DOCUMENTS

| | | | |
|---|---|---|---|
| WO 96/13927 | 5/1996 | (WO) | ........................ H04M/3/42 |
| WO 96/21323 | 7/1996 | (WO) | ........................ H04Q/3/00 |

OTHER PUBLICATIONS

"Call Delivery to Portable Telephones Away from Home Using the Local Exchange Network" Michael J. Beller, Communications—Rising to the Heights, IEEE, Jun 23, 1991.

"Interworking Between Public Networks and Customer Premises Systems on Dynamic Call Routing", Intelligent Networks: The Path to Global Networking, Proceedings of the International Council for Computer Communication Intelligent Networks Conference, May 4, 1992.

"DCO Networking Solutions to the Provision of Advanced Features in Rural and Suburban Telephone Networks", Communications for the Information Age, IEEE, Nov. 28, 1988.

\* cited by examiner

*Primary Examiner*—Huy D. Vu
(74) *Attorney, Agent, or Firm*—Foley & Lardner

(57) ABSTRACT

A method, apparatus and system for dynamically routing selected calls through an intelligent switched telephone network are described. The method leverages the resident switching power in the Public Switched Telephone Network by departing from the Advanced Intelligent Network (AIN) call model while adhering to the basic principles of ISUP common channel signaling to introduce new flexibility in call routing. Using the method, calls can be efficiently routed and rerouted through the network. Control of a call can be effected by either the called party or the calling party. The method can be practised using either a virtual switching point (VSP) or an ISTP. The VSP is a physical mode in the signaling plane of the network and a virtual node in the switching plane. Calls are routed to the VSP using dedicated trunk groups which may be loop-back ISUP trunks or inter-switch ISUP trunks. Calls are routed to the dedicated trunk groups using standard routing translation tables and methods. The advantage is a new level of flexibility in call routing control that permits the rapid introduction of new services which include features that could not be efficiently accommodated using prior methods of call routing.

56 Claims, 14 Drawing Sheets

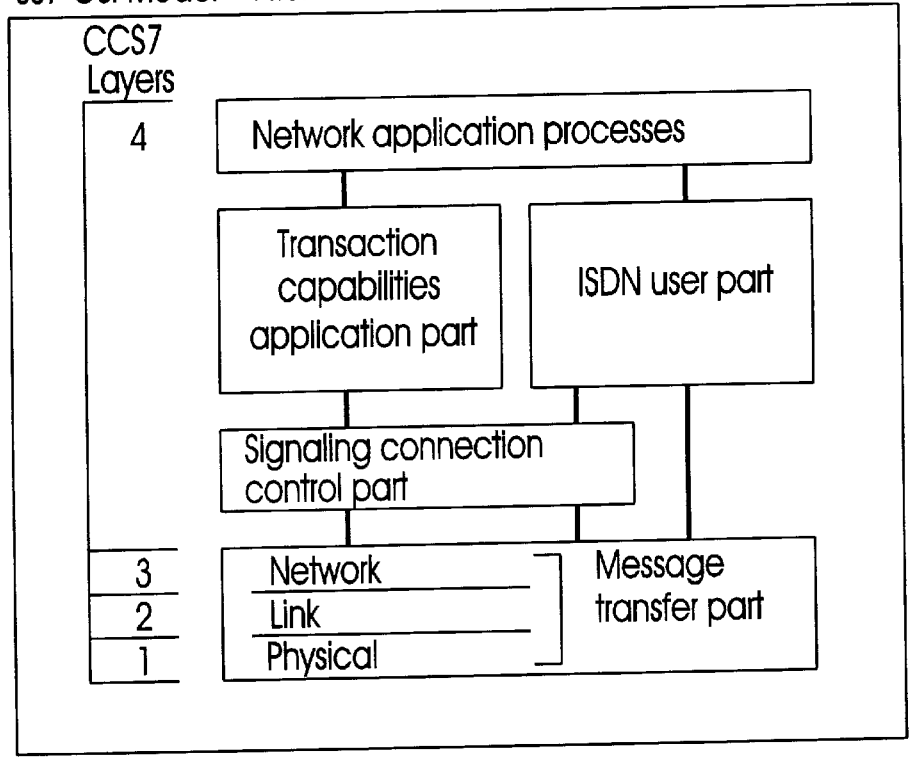
Fig. 1a - Prior Art
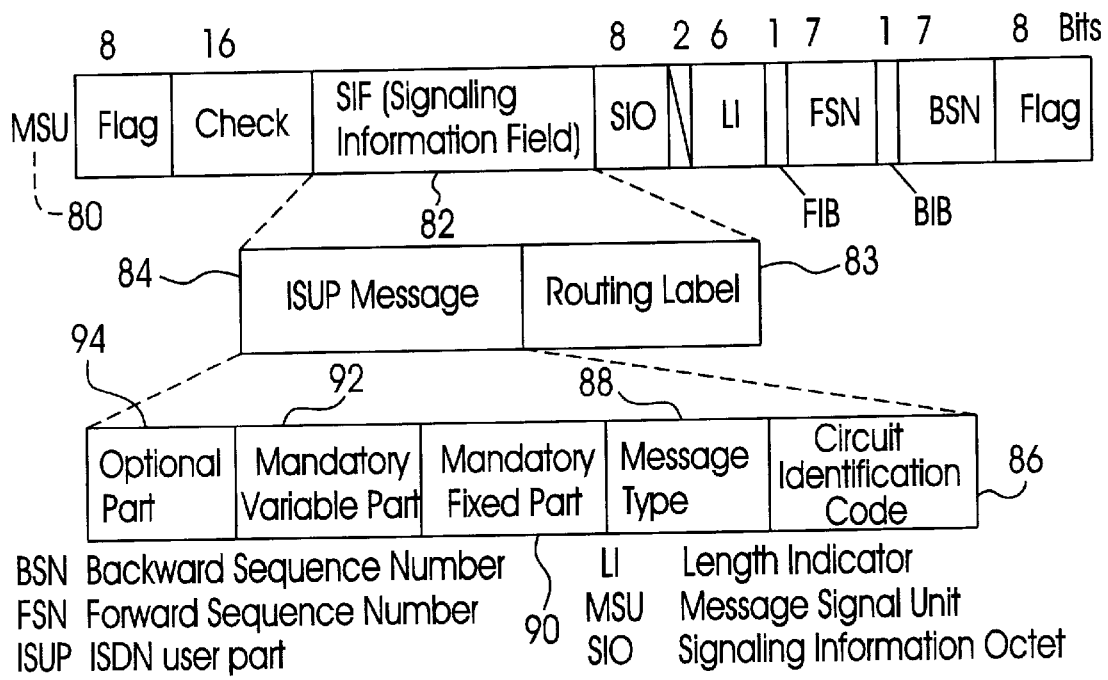
BSN Backward Sequence Number
FSN Forward Sequence Number
ISUP ISDN user part
LI Length Indicator
MSU Message Signal Unit
SIO Signaling Information Octet
Fig. 1b - Prior Art

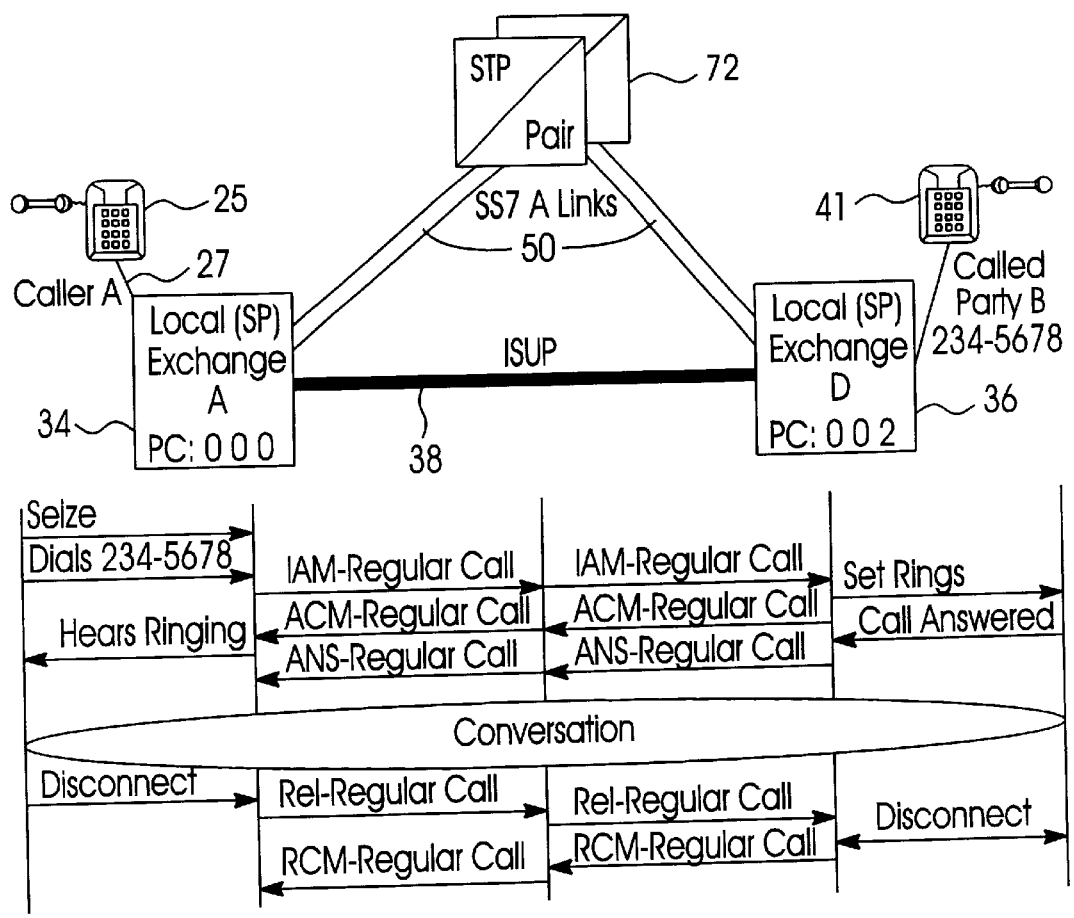
Fig. 2 - Prior Art
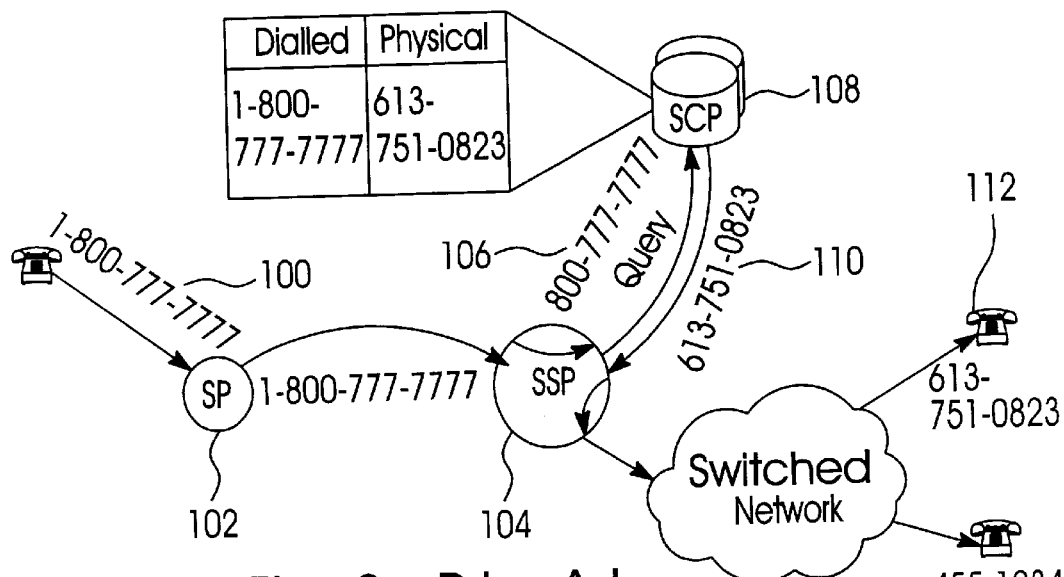
Fig. 3 - Prior Art

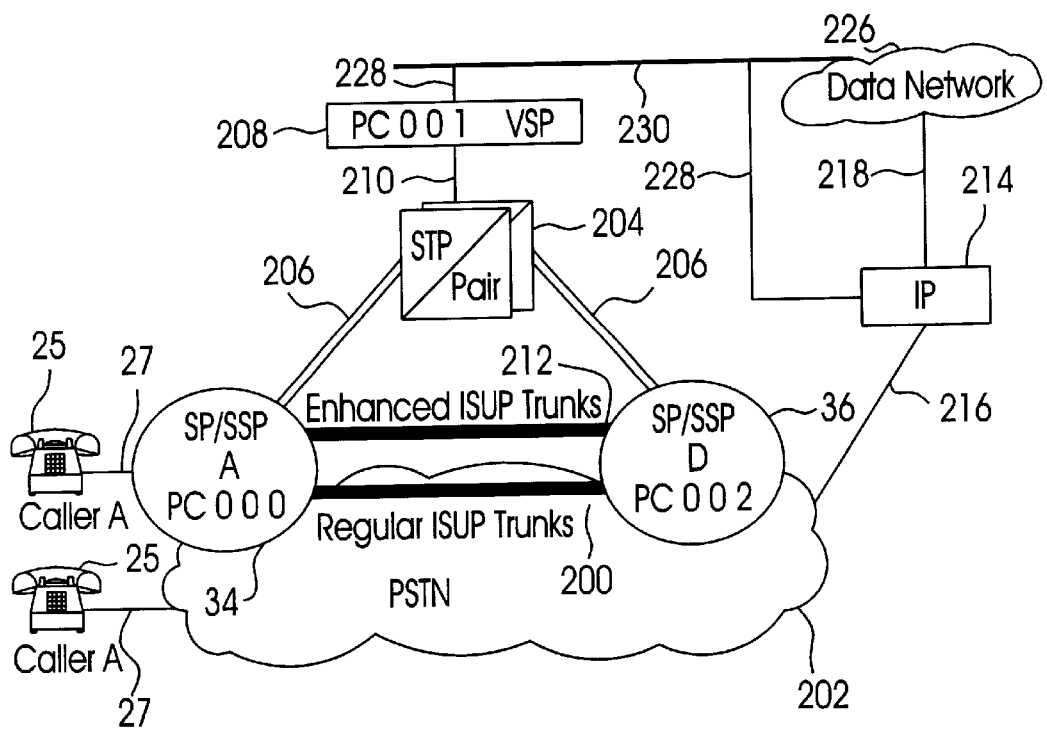
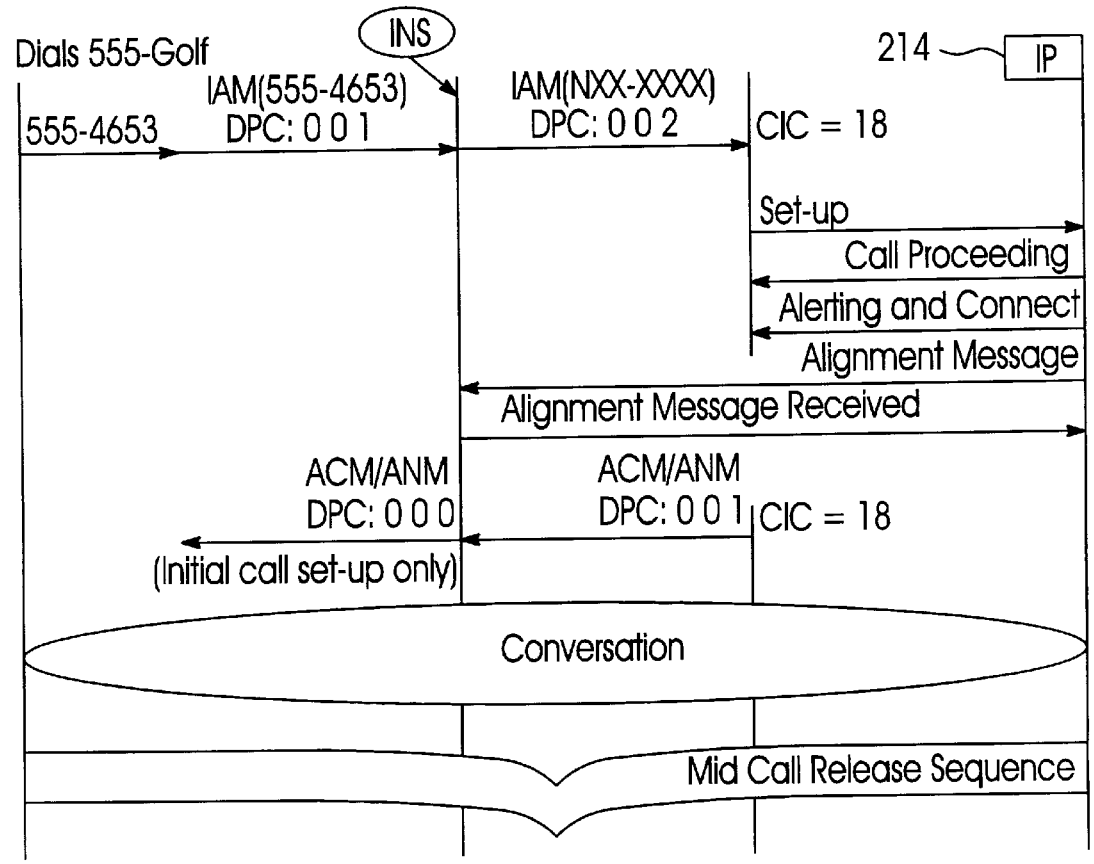
Fig. 6b

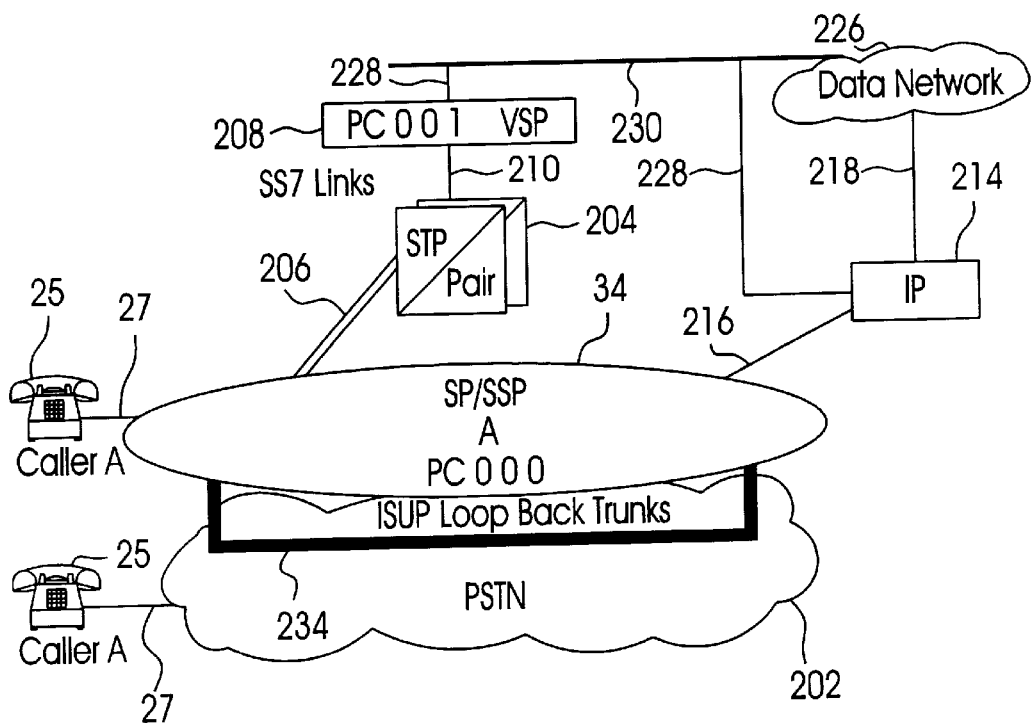
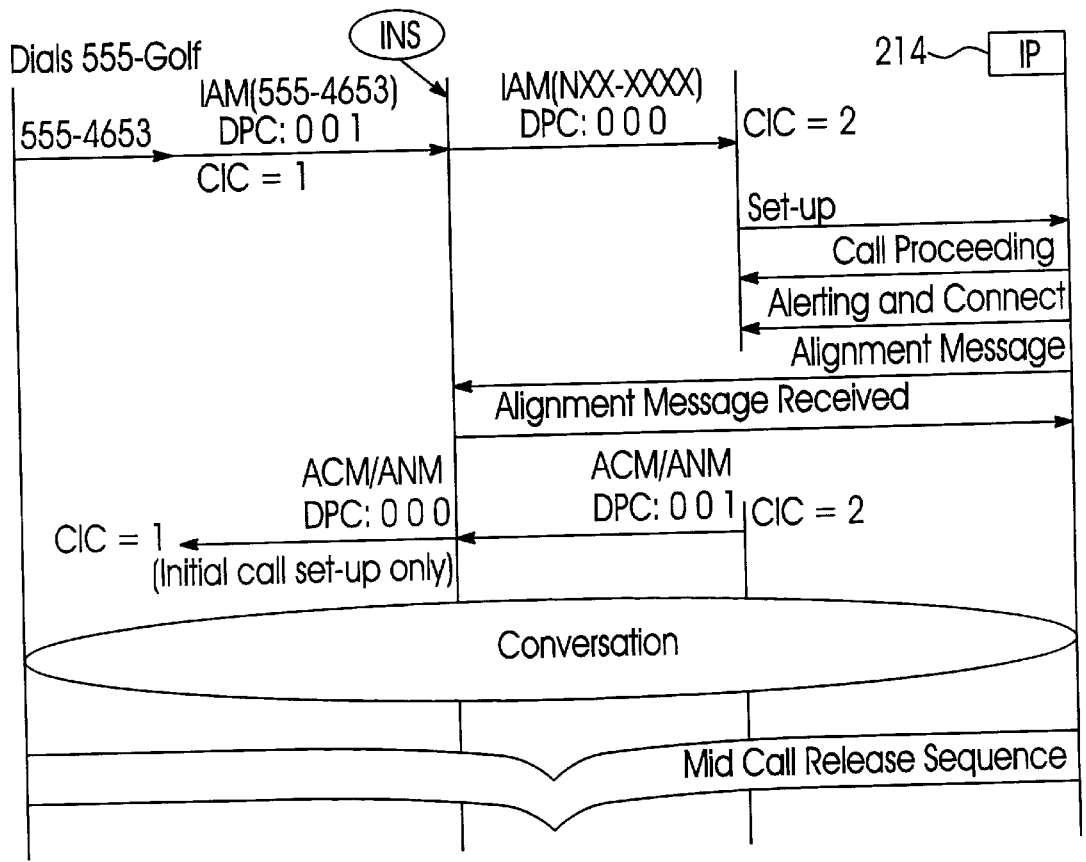
Fig. 6c

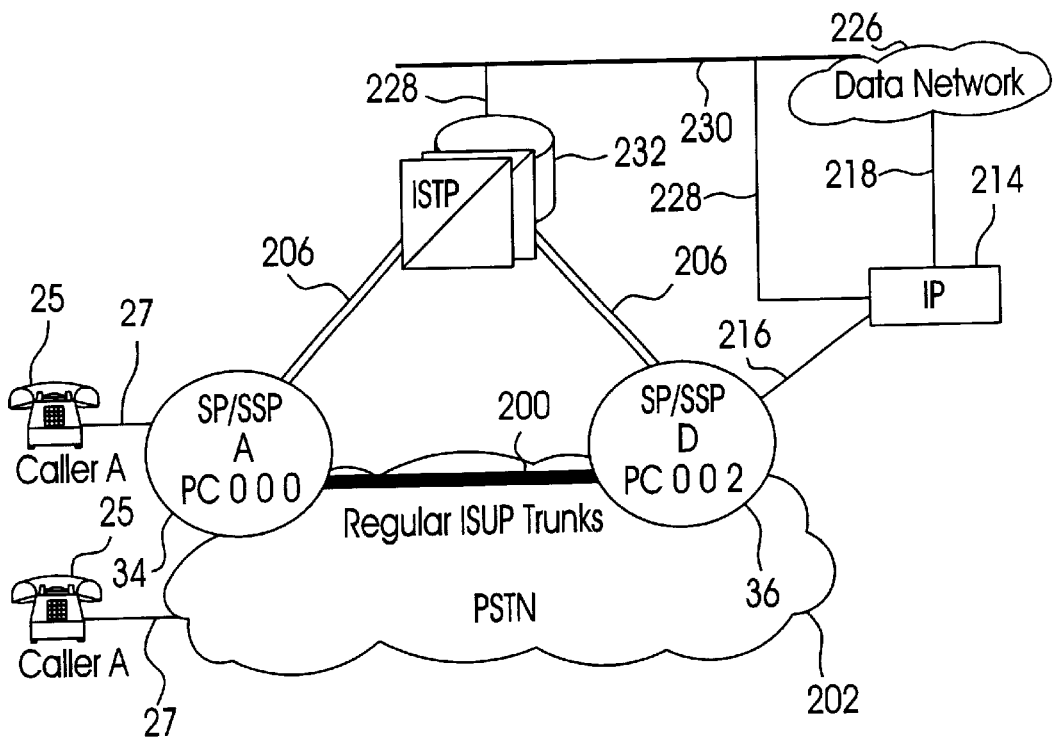
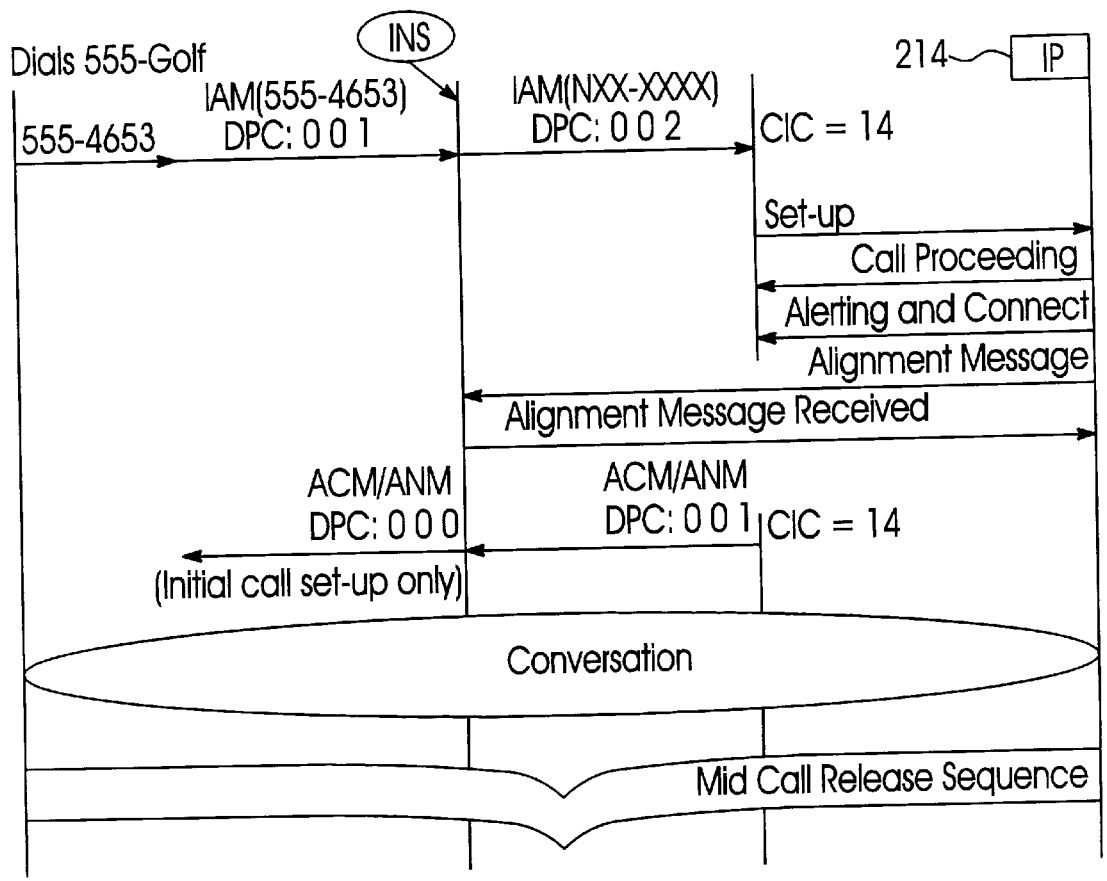
Fig. 6d

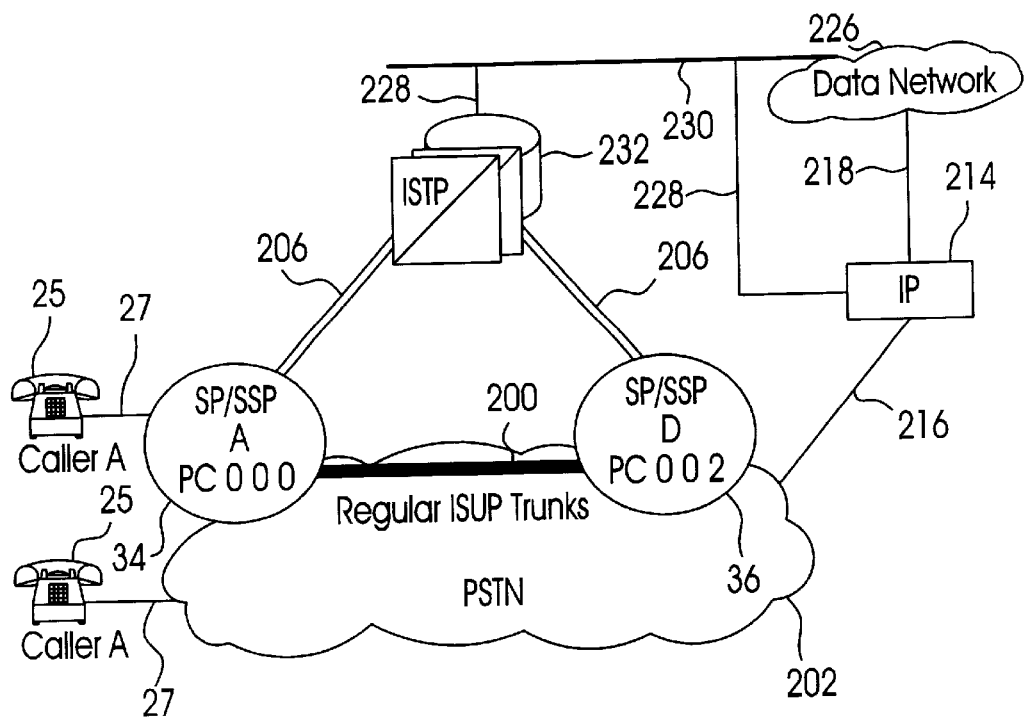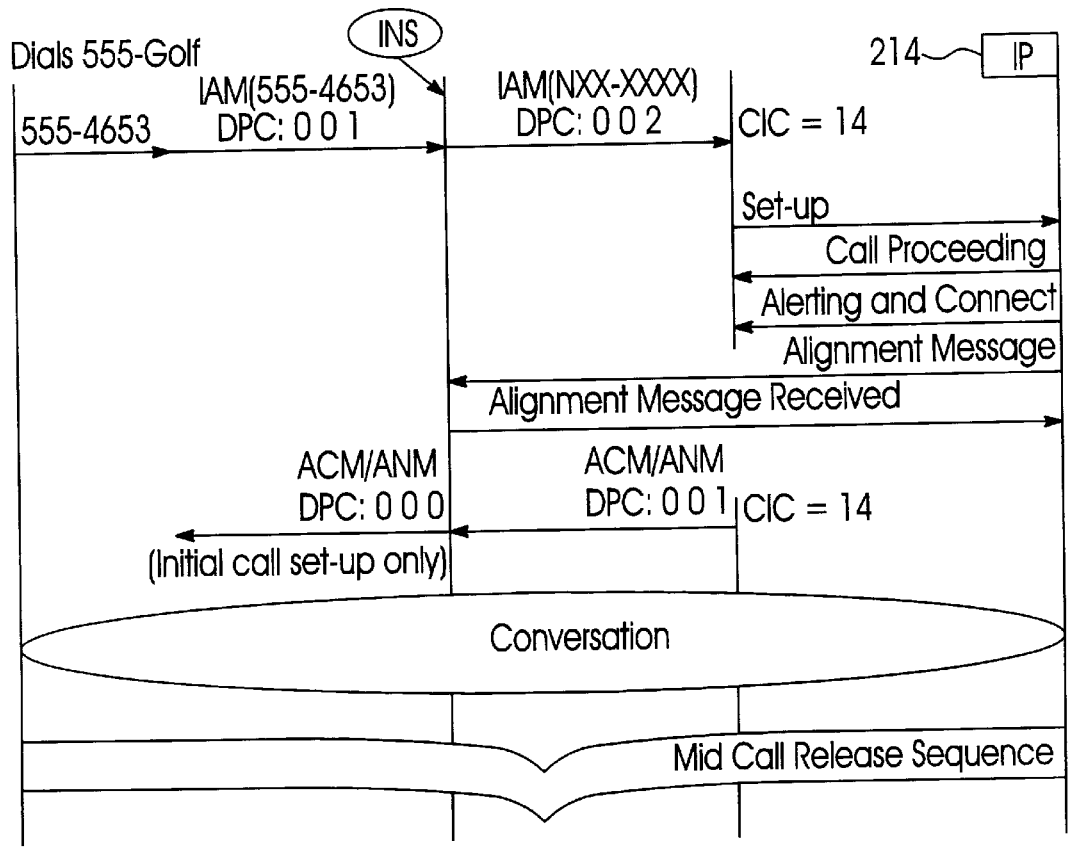
Fig. 6e

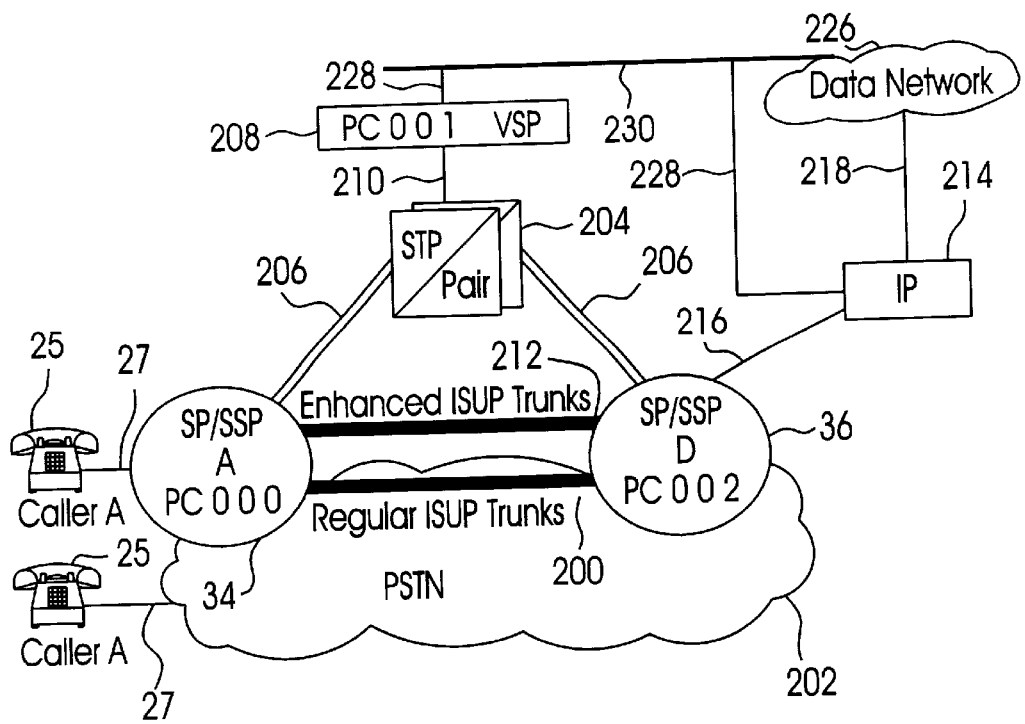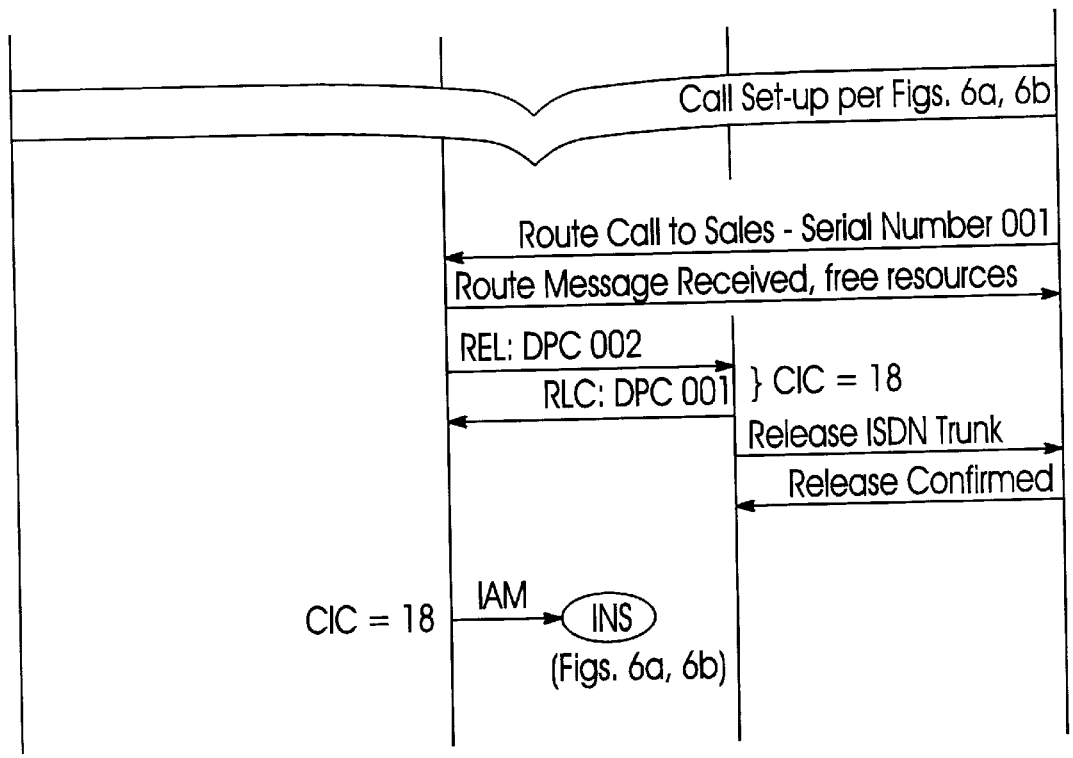
Fig. 7a

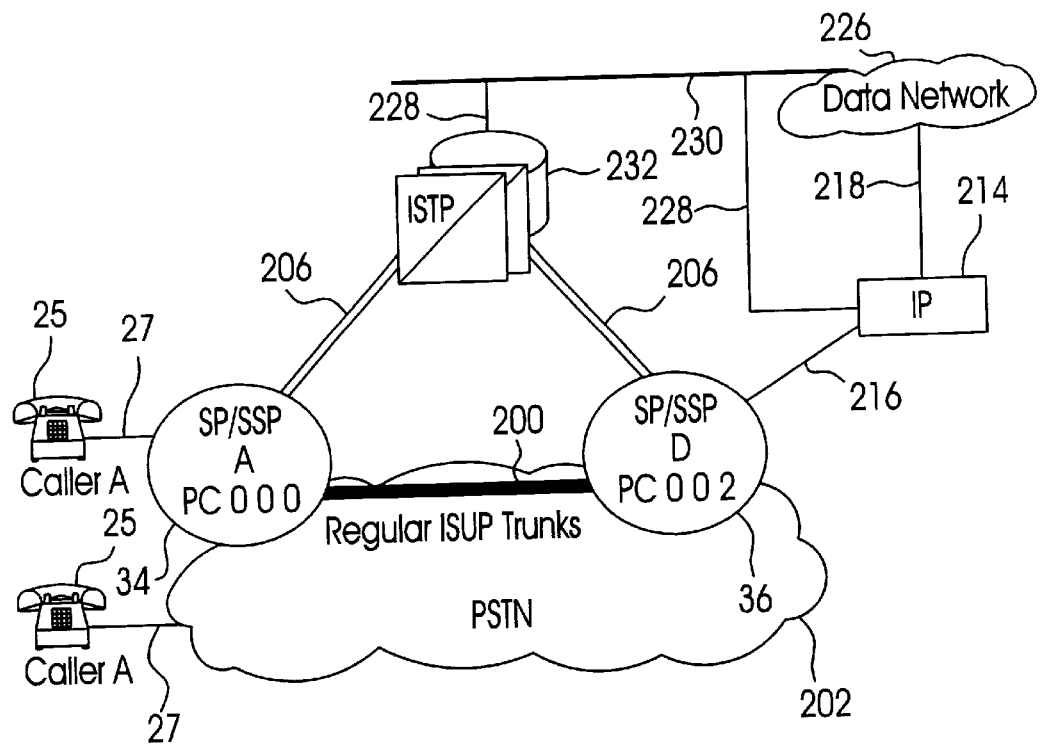
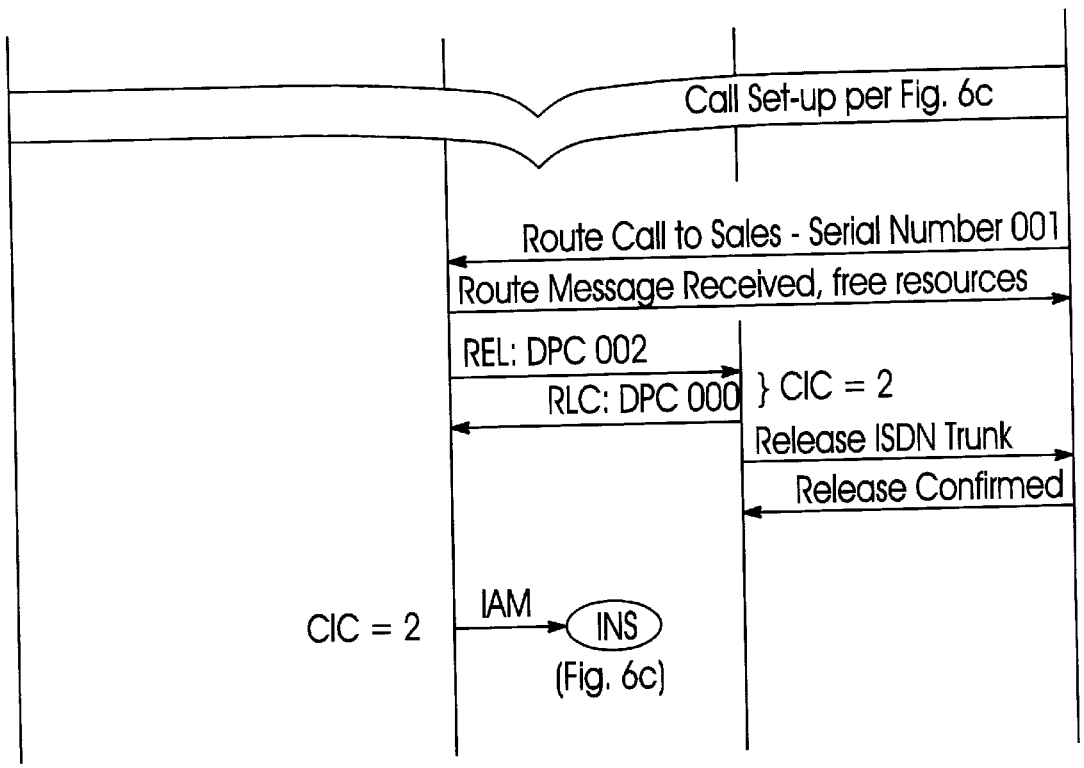
Fig. 7b

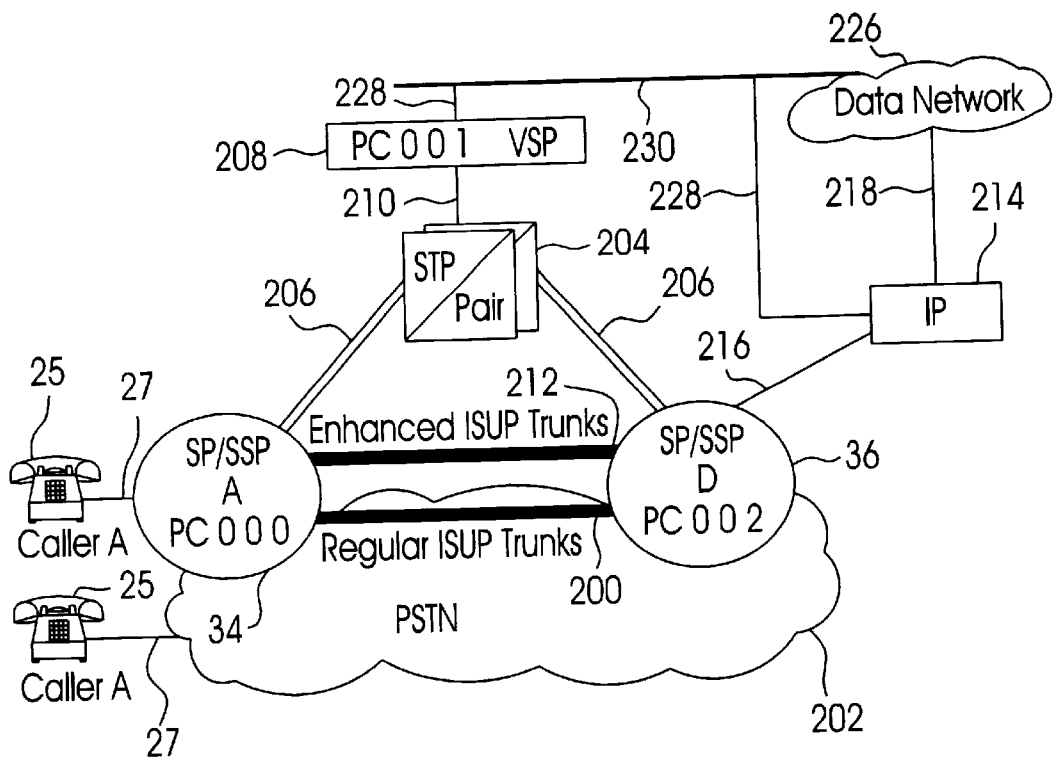
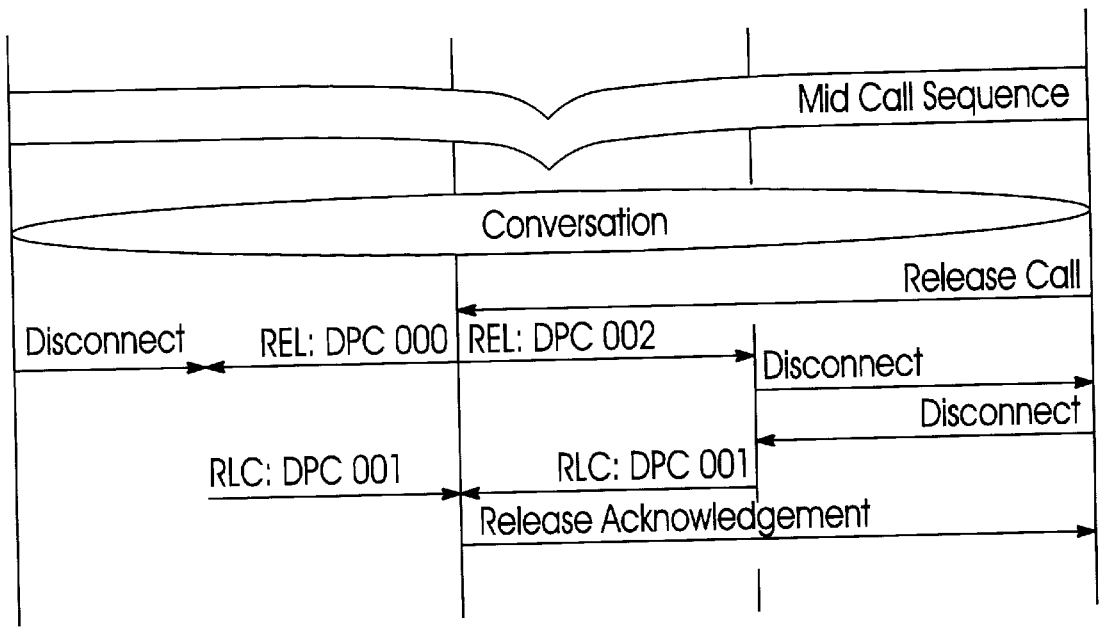
Fig. 8

METHOD AND APPARATUS FOR DYNAMICALLY ROUTING CALLS IN AN INTELLIGENT NETWORK

TECHNICAL FIELD

This invention relates to the routing of calls through an intelligent switched telephone network, and in particular to a novel method and apparatus for dynamically rerouting calls through the network without disconnection of the calling party in response to any predefined criteria using standard common channel signaling messages generated at a call control node which is a virtual node in the switching plane and a physical node in the signaling plane of the network.

BACKGROUND OF THE INVENTION

Use of the telephone as a social and business instrument has exponentially grown over the past 100 years. The widespread acceptance of the telephone and its uses have spurred industry to create many innovations to facilitate call completion and enhance telephone services. Today's telephone user community is sophisticated in the use of telecommunications equipment and demands faster connections, more services, and better integration with computer applications to assist in streamlining their business operations.

The Public Switched Telephone Network (PSTN) has evolved to a highly automated computer-controlled switched network which permits callers to place calls to practically anywhere in the world. In this document use of the term PSTN is intended to refer to any intelligent switched telephone network.

Much of the PSTN is now referred to as the Advanced Intelligent Network (AIN). In AIN, standardized "triggers" embedded in the fabric of the network switching nodes permit call requests to trigger database queries for seeking call routing information. After call routing information is returned from a queried database, the call is connected through the network using standard procedures.

Although the AIN is a high-speed multifaceted network which provides a vast array of automated telephone services, service development in the AIN is channelled by the AIN call model. In the AIN new service development is accomplished using Service Creation Environments to create service logic programs that are executed by Intelligent Service Control Points (ISCPs), which are databases that respond to switch queries initiated by the AIN triggers. In the AIN call model the opportunities for initiating routing decisions are essentially limited to the trigger points embedded in the network switch fabric. Although the services offered in the PSTN are constantly being expanded and enhanced, new services are now routinely developed within the context of the AIN call model.

An example of one such new service is taught in U.S. Pat. No. 5,377,186 that issued Dec. 27, 1994 to Wegner et al. It provides a system and method for retrieving enhanced subscriber services from a database and delivering those services to subscribers of the PSTN without requiring the upgrading of local switches to operate with Transaction Capabilities Application Part/Advanced Intelligent Network (TCAP/AIN) communications protocol. A plurality of local switches that are connected to an Advanced Intelligent Network (AIN) are enabled to provide subscribers with access to the network. This is accomplished using at least one Virtual Service Switching Point (ViSSP) within the AIN for storing a database of enhanced subscriber services. The local switches or tandem switches to which they are linked may retrieve the enhanced subscriber services from the ViSSP utilizing the Integrated Services Digital Network User Part (ISUP) of SS7 call set-up protocol. While the patent teaches the use of a virtual service switching point to expand AIN capabilities into local switches without expensive local switch upgrades, the use of the ViSSP is limited to use in accordance with the AIN call model described above.

The computer communications industry and the telecommunications industries are beginning to merge, but there has always been a measure of difficulty with the integration of the two. The PSTN has been perceived by those in computer communications as a closed architecture, encouraging computer vendors to displace the PSTN by creating overlay networks which avoid capitalizing on any more than core PSTN functionality.

Call routing using an overlay network requires many additional connections to the PSTN for both access and egress. Besides, routing within the PSTN from overlay networks often leaves connections established in nodes which are redundant to the call path. In overlay networks where there are limited connection points to the PSTN, calls can be routed over significant distances even though a call may complete on a network switching node where it originated. To address this problem, the telephone industry has endorsed the solution of release link trunk functionality for subsequent routing or rerouting of calls. The release link trunk functionality can reside in either the PSTN or in an overlay network, but the release link feature can only reside within a network switching node. The release link feature permits data messaging, usually SS7 ISUP messaging, to release a call back to the call set-up point, where rerouting can be performed to redirect the call. This feature is in wide use in the telecommunications industry today. Although the release link feature resolves some of the problems associated with redundant connections in the call path, the fact it is switching node resident is a significant drawback. Switch development and differences in proprietary protocols limit the use and availability of release link features. The development of new features for telephone switching nodes generally requires many months and involves considerable expense. Switch vendors therefore prioritize feature implementation based on aggregate demand, frequently placing service providers in a position of waiting for feature implementation. Adjunct solutions such as Intelligent Peripherals (IP) are therefore often sought. The intelligent peripherals provide resource management of devices such as voice response units, voice announcers and DMTF units for call-activated services. IPs are not seen in the signaling network, however, so they are not enabled to directly control call processes.

Other innovative workarounds have been inspired by the unique requirements of call centers, for example. In session activation, transfer and connect, line transfer and other features have been implemented in the PSTN using novel solutions. To date, however, service developers have not really leveraged the call routing power resident in the PSTN.

SUMMARY OF THE INVENTION

It is an object of the invention to provide a method and apparatus for leveraging the switching power resident in the PSTN by departing from the AIN call model while adhering to the basic principles and requirements of the common channel signaling protocol.

It is a further object of the invention to provide a method of dynamically routing selected calls through an intelligent switched telephone network using common channel signaling messages generated by a call control node in the common channel signaling control path for a call.

It is yet a further object of the invention to provide a method of completing calls through the PSTN wherein the calling party controls subsequent routing of the call by interactive selection of parameters from a source at a call connection.

It is a further object of the invention to provide a method of completing calls through the PSTN wherein the called party controls subsequent routing of the call by rerouting the call to another called party.

It is a further object of the invention to transfer call control from the PSTN to a virtual switching node which is a virtual node in the switching plane of the PSTN and a physical node in the signaling plane of the network.

It is yet another object of the invention to provide control over call routing using a data network for communications with a call control node in the signaling plane of the PSTN to enhance subscriber services.

The invention provides a method of dynamically routing selected calls through an intelligent switched telephone network using common channel signaling messages generated by a call control node in the common channel signaling control path for the call, comprising the steps of:

a) routing a call through the network to a first termination in response to a number dialed by a calling party so that the common channel control signaling path for the call passes through the call control node;

b) receiving at the call control node an indication that a predetermined criteria related to the call has been met;

c) determining at the call control node a new termination for the call indicated directly or indirectly by the predefined criteria;

d) initiating the release of the call termination using at least one common channel signaling message generated by the call control node without releasing the calling party;

e) initiating the rerouting of the call to the new termination using at least one common channel signaling message generated by the call control node; and f) repeating steps b)–e) until the call is terminated.

The invention also provides apparatus for dynamically routing selected calls through an intelligent switched telephone network comprising:

a common channel signaling interface for receiving messages from and sending messages to a common channel signaling network;

a memory for storing at least one of the common channel signaling messages;

a memory for storing programs enabling a processor to examine common channel signaling messages received at the common channel signaling interface, generate common channel signaling messages for controlling call connections, track calls virtually routed through the apparatus, and assess predefined criteria to determine an action respecting the control of call connections; and a processor enabled for executing the programs.

The invention further provides a system for dynamically routing selected calls through an intelligent switched telephone network, comprising:

a call control node in a common channel signaling network of the intelligent switched telephone network;

means for routing selected calls so that a common channel signaling control path for the selected calls passes through the call control node;

an Intelligent Peripheral (IP) connected to the intelligent switched telephone network, the IP being adapted to respond to caller inputs from the selected calls; and a data connection that links the call control node and the IP, whereby when one of the selected calls is completed through the call control node and terminated at the IP, the IP is enabled to collect inputs from a calling party and pass data to the call control node to permit the call control node to release the call in a forward direction and to reconnect the call to a new termination specified by the data without releasing the calling party.

The method and the apparatus in accordance with the invention provide the tools for leveraging the resident switching power in the PSTN. They also provide the tools for rapidly and inexpensively developing and deploying new services in the public switched telephone network. The method in accordance with the invention provides a new model for developing telephone services wherein calls are routed by routesets and linksets that direct common channel signaling call control messages to a call control node. Thereafter, control of the call is assumed by the call control node which functions as a virtual switching point in the call path. The call control node may use ISUP signaling messages to control any connection point in a call path. This permits individual connection points in the call path to be established and released while maintaining a connection with the calling party.

The call control node is preferably a high speed computing machine having a common channel signaling interface, a data network interface and application programs that permit the call control node to examine, modify and generate common channel signaling messages. This embodiment of a call control node is referred to as a Virtual Switching Point (VSP) and it is assigned a switch node Point Code in the common channel signaling network. Alternatively, the call control node may be an Intelligent Signal Transfer Point (ISTP) programmed to perform the functions required of the call control node.

It is envisioned that at least initially only selected calls will be routed through a VSP in order to simplify application programs and to scale the processing power of the computing machine required at the node. Initial deployment of a VSP therefore preferably entails a minimal conditioning of the network in which ISUP trunks are allocated or installed for routing the selected calls to the call control node. Switch translation tables are created to route the selected calls to the designated ISUP trunk group(s), hereinafter referred to as "enhanced ISUP trunks" or "EISUP trunks". The EISUP trunk group may be a loop-back trunk group or an inter-switch trunk group. In either case, the VSP is a virtual node between terminating ends of the trunk group and a physical node in the signaling plane so that all common channel call signaling messages related to the selected calls are physically routed through the VSP. This network conditioning may be localized to a single switching point or implemented network wide depending on the type of service offered and the extent to which it is made available to the public. After initial network conditioning is accomplished, the rapid development and deployment of new services is enabled in the conditioned portion of the network. If an ISTP is used to perform the functions of a call control node, the only network conditioning required is the programming of all ISTPs required to control the selected calls, making certain that the selected calls transit ISUP trunks associated with the programmed ISTPs.

The method and apparatus in accordance with the invention provides call control flexibility within the PSTN which was heretofore uncontemplated. By intelligently controlling logical connection points in the call path through manipulation of Integrated Services ISDN User Part (ISUP) common channel signaling message conventions, significant added flexibility may be realized. While the invention departs from the constraints of the AIN call model, it leverages the routing power resident in the PSTN by adhering to the basic principles and requirements of ISUP common channel signaling as defined in ANSI standard T1.113.3 and CCITT Standard Q763.

BRIEF DESCRIPTION OF THE DRAWINGS

The invention will now be further explained by way of example only and with reference to the following drawings wherein:

FIG. 1a is a schematic diagram showing the layers of the SS7 signaling protocol;

FIG. 1b is a schematic diagram of an SS7 ISUP message;

FIG. 2 shows a progression of a call between two local exchanges in the PSTN using common channel signaling and prior art call control methods;

FIG. 3 is a schematic diagram showing example of a prior art AIN call flow;

FIGS. 6a–6e are schematic diagrams showing initial call setup sequences in accordance with the methods of the invention;

FIGS. 7a–7c are schematic diagrams showing mid-call release sequences used in the practice of the methods of the invention; and FIG. 8 is a schematic diagram showing an end call release sequence used in the practice of the methods of the invention.

DETAILED DESCRIPTION OF THE PREFERRED EMBODIMENTS

Figure 4A:
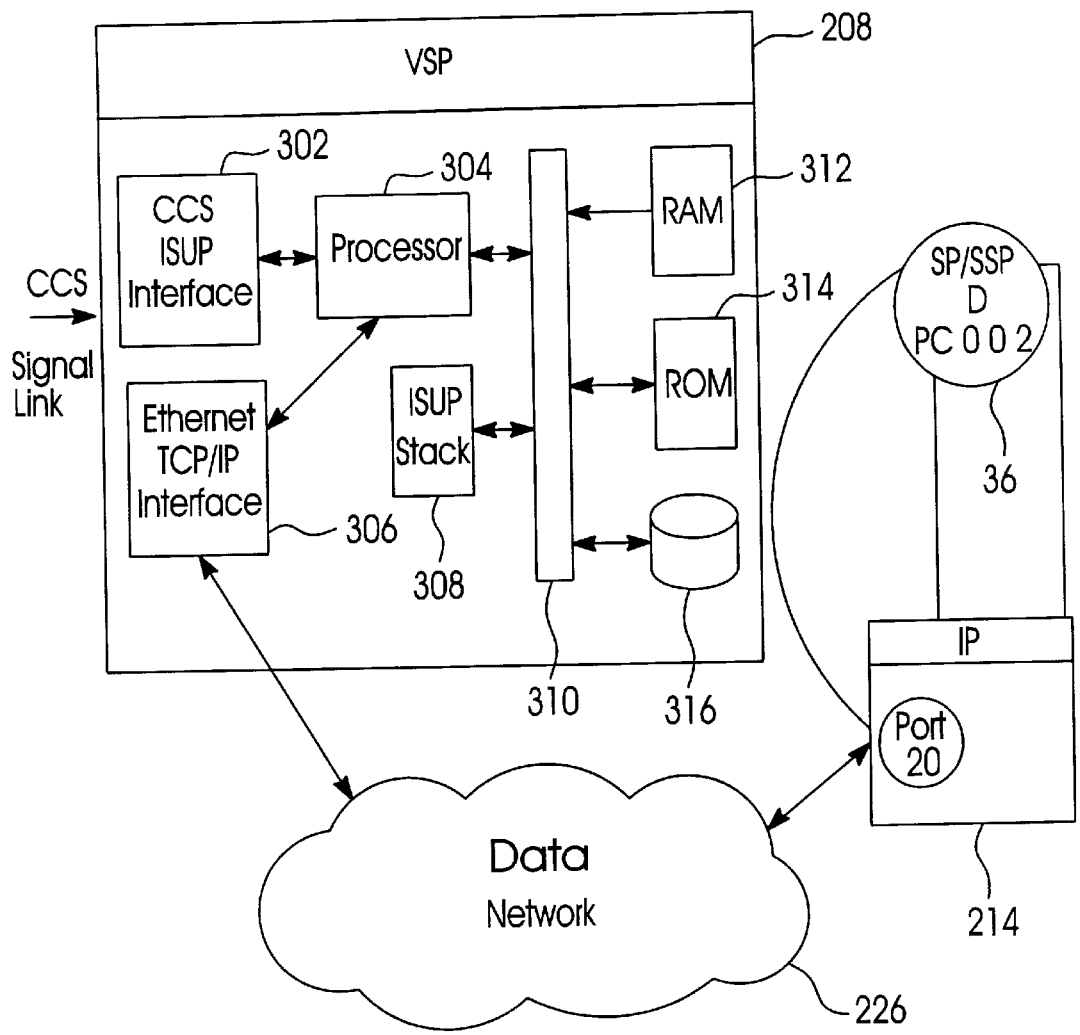
FIG. 4a is a schematic diagram showing the architecture of a call control node referred to as a Virtual Switching Point (VSP) and its connection to an Intelligent Peripheral (IP) through a data network.

The Public Switched Telephone Network (PSTN) has evolved to an integrated automated intelligent network capable of sophisticated autonomous call routing. Calls routed through the PSTN follow well-established call procedures. Call procedures have evolved along with the capabilities of the PSTN. Call procedures determine how calls are handled in the network and consequently determine the type of services that can be made available in the network. Call procedures have been developed to provide reliable interconnection between network elements through a rigid set of rules. Those call procedures are principally embodied in the standards for common channel signaling.

Signaling System 7 (SS7) is the currently accepted standard for common channel signaling. SS7 is an international standard developed by the CCITT, now known as the International Telephone Union (ITU). FIG. 1a shows a schematic diagram of the SS7 layers. They consist of:

Message Transfer Part (MTP) layer used to establish signaling link connectivity between switching elements;

Signaling Connection Control Part (SCCP) used to control data link connections through the switched telephone network;

Integrated Services Digital Network User Part (ISUP) used to transmit routing information between switching elements; and Transaction Capabilities Application Part (TCAP) used to formulate database queries and provide database responses for Intelligent telephone services.

The SCCP, the ISUP, and the TCAP are each components of the user parts application layer of the SS7 protocol.

ISUP is the most common inter-exchange routing protocol used in the telephone network at this time. With the MTP established and common channel signaling links synchronized and aligned, five basic ISUP messages are required for most call handling. Those messages include:

Initial Address Message (IAM);
Address Complete Message (ACM);
Answer Message (ANS);
Release Message (REL); and
Release Complete Message (RLC).

In addition, under TR-NWT-000246, a suspend message is sent when the called party disconnects first but this is not universally used in the SS7 network.

In ISUP signaling, Message Signal Units (MSUs) are the SS7 messages used to carry call routing information between nodes. FIG. 1b is a schematic diagram of the ISUP message format. Each MSU 80 includes flags to indicate the beginning and end of the message as well as backwards and forwards sequence numbers to facilitate the ordering and grouping of message units. Each MSU 80 also includes a Signaling Information Field (SIF) 82 which consists of a routing label 83 and an ISUP message 84. The routing label 83 stores an Originating Point Code (OPC) and a Destination Point Code (DPC) for the message. Point Codes uniquely identify each node in a SS7 network. The ISUP message part 84 is variable in length and includes such information as the Circuit Identification Code (CIC) 86 which identifies the voice trunk over which the call is carried. A Message Type 88 which indicates the type of ISUP message being sent and details about the call are contained in the Mandatory Fixed Part (MFP) 90, a Mandatory Variable Part (MVP) 92 and an Optional Part (OP) 94.

To illustrate the use of ISUP messaging for call connection control, FIG. 2 shows a progression of a call between two local exchanges 34, 36 using the common channel signaling network to set up and control the call. When caller A goes off-hook at telephone 25, the user line 27 is seized and the caller receives a dial tone indicating that the local exchange is available to receive dialed digits. Caller A dials 234-5678, for example, as indicated in FIG. 1b. On receipt of the dialed digits, the local exchange 34 consults its translation tables and determines that it cannot complete the call locally. The translation tables indicate that the call should be routed to local exchange 36. In response, exchange 34 formulates an ISUP IAM message for a regular PSTN call. The local exchange 34 inserts its point code (000) into the Originating Point Code (OPC) of routing label 83 (see FIG. 1b) and the point code of the local exchange 36 (002) in the Destination Point Code (DPC) of the routing label 83 and forwards the message over SS7 A-links 50 to a Signal Transfer Point (STP) in a mated pair of STPs 72. The STP examines the DPC to determine that the message should be forwarded to local exchange 36. On receipt of the ISUP IAM message, the local exchange extracts the dialed number and consults its translation tables which indicates that the call is to be completed to called party B at telephone 41. It therefore seizes a member of the ISUP trunk group 38 indicated by the Circuit Identification Code (CIC) 86 of the ISUP IAM message and sets ringing signals on the line of the called party telephone 41. Local exchange 36 then formulates an ISUP ACM message indicating that the address is complete and returns the ACM message via an STP of STP pair 72 to the local exchange 34 which generates a ringing signal on user line 27 for the benefit of caller A at telephone 25. When the called party B answers the telephone 41, the off-hook condition is sensed by local exchange 36 which formulates a ISUP ANS message which it forwards via an STP of STP pair 72 over SS7 A-links 50 to the local exchange 34. On receipt of the ANS message, local exchange 34 ceases the ringing signal to telephone 25 and conversation ensues between caller A and called party B over the member of ISUP trunk group 38. After the conversation between the parties is complete, caller A hangs up telephone 25 which sends an on-hook indication to local exchange 34, indicating that the call has been disconnected. The local exchange 34 therefore formulates an ISUP REL message which it forwards via an STP of STP pair 72 to local exchange 36. On receipt of the REL message, the local exchange 36 applies dial tone to the line of caller telephone 41 indicating that the call has been disconnected. When the called party B hangs up the receiver at telephone 41, the on-hook condition alerts the local exchange D that the call is disconnected and it releases the seized member of ISUP trunk 38. Thereafter it formulates a ISUP RLC message which it returns to local exchange 34 and the local exchange 34 releases the originating end of the ISUP trunk member used by the call. The RLC message is not triggered by the disconnection of called party B.

FIG. 3 is a schematic diagram of a call process based on the prior art AIN call model which is widely implemented in the North American PSTN. In the AIN standardized triggers embedded in the fabric of Service Switching Points (SSPs) enable the SSPs to formulate TCAP queries to databases whenever a trigger condition is satisfied. AIN triggers may be based on dialed digits, originating line identification or any one of several other recognized variables during various points in the call connection process. In the example shown in FIG. 3, when a caller 100 goes off-hook and dials the number 1-800-777-7777, the SP 102 collects the dialed digits and consults its routing tables which instruct it to forward them in an IAM message via the SS7 network to the SSP 104. The dialed 1-800 in the IAM message triggers the SSP 104 to formulate a TCAP query that is sent to the AIN SCP 108 which translates the dialed digits 1-800-777-7777 into the physical address of the called party, which is a PSTN number 613-751-0823. The AIN SCP returns the PSTN number in a TCAP response message to the SSP 104 which consults its translation tables to determine that area code "613" is served by some other switch in the switched network. It therefore formulates an ISUP IAM message which includes the translated PSTN number and transmits that message into the switched network which forwards the message to the switching node that serves the called number. The call is then terminated to the called number and call progression with the associated ISUP messaging ensues, as described above with reference to FIG. 2.

The present invention leverages the switching power resident in the PSTN by capitalizing on capabilities currently available in standard ISUP signaling methods. This is accomplished by treating logical connection points in the call path as controllable connections which may be manipulated within the constructs of ISUP messaging to utilize the versatility embedded in the existing network for enhanced call handling. The invention thereby provides a means for rapidly developing and deploying call services by providing a new network element which functions in the network as a virtual switching point but is not burdened by the switching fabric or switching functionality. The invention may be implemented in the network using any one or more of a number of options which are explained below in detail.

In order to illustrate a service which may be implemented using the invention, a practical application involving an Intelligent Peripheral in the form of an Interactive Voice Response unit (IVR) will also be explained in detail. It should be understood that the description which follows is exemplary and that a vast array of services may be rapidly developed and deployed using the methods and the apparatus of the invention.

In general terms, the invention relates to a method for performing call rerouting during a telecommunications session by collecting information from a calling or a called party and using that information to dynamically reroute the call. Rerouting is accomplished using the signaling protocols and procedures of ISUP signaling. Call control is accomplished with a call control node which is a virtual node in the switching plane of the network and a physical node in the signaling plane of the network. Control of selected calls is passed to the call control node by routing selected calls to telecommunications service facilities designated to route the selected calls to the call control node. Calls which do not require special call control are routed over regular telephone facilities.

This method has the advantage of permitting control of a call from the call control node in the SS7 signaling path by releasing the call in either the ingress or the egress directions independently. The originating end of an SS7 controlled voice trunk is thereby functionally separated from the terminating end of the trunk. With SS7 ISUP signaling, the switching system at the originating end or the terminating end of the trunk is unaware that the connection is not retained on the opposite end of the facility. This permits either end of the call to be terminated to any other destination without loss of the connection. The invention can thus be used to exercise greater control over call routing by permitting either the calling party or the called party to enhance call flow.

VSP System Architecture

FIG. 4a is a schematic diagram of an exemplary architecture for a Virtual Switching Point (VSP) 208. The VSP 208 is a preferred choice for the call control node in accordance with the invention. The VSP 208 includes a common channel signaling interface 302 which is capable of receiving common channel signaling messages from a common channel signaling network and emitting messages into the network. Common channel signaling interface 302 is accessed by a processor 304 which also accesses a data network interface 306 that may be, for example, a TCP/IP interface for connection to a data network 226 such as the Internet, or any other packet transport. The processor 304 is connected to a databus 310 to permit access to RAM memory 312 and ROM memory 314 as well as disk storage memory 316. Each of the RAM, ROM and disk storage are configured and used in a manner well understood in the art. The processor 304 also has access through the databus 310 to an ISUP stack 308 which permits application programs executed by the processor 304 to examine, modify and generate SS7 ISUP messages. The ISUP stack 308 may be a part of RAM memory 312.

Also connected to the data network 226 is an Intelligent Peripheral (IP) 214 which will be discussed in more detail below as an example of a practical application of the invention in the PSTN. The IP 214 is connected to the PSTN through a Switching Point (SP) 36 and to the data network 226, as will also be described below.

Figure 4B:
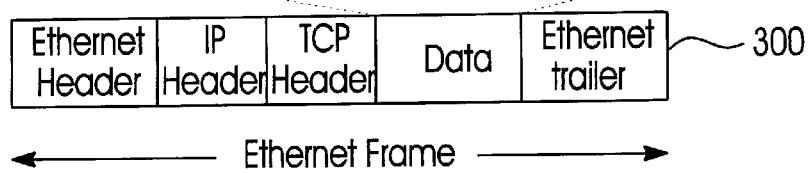
FIG. 4b draws a message format that may be used to exchange messages between the VSP and the IP.

Communications between the VSP 208 and the IP 214 through the data network 226 may be accomplished in accordance with any acceptable protocol. FIG. 4b shows a data packet 300 in TCP/IP format and an exemplary data content of the packet, which will be referred to in the discussion which follows. Communications through the data network permit any processor programmed to communicate with the VSP 208 to direct call flow by providing a new termination number, for example. Those skilled in the art will appreciate the potential and flexibility in service design and implementation that this enables.

Network Configurations

FIGS. 5a–5d schematically illustrate four preferred network configurations for implementing the invention in a portion of the PSTN. These four network configurations are exemplary only. Other configurations may be used for the same purpose. In each of the network configurations described below, the network is configured to route selected calls through a call control node which may be the VSP 208 (see FIGS. 5a, 5c or 5d) or an Intelligent Signal Transfer Point (ISTP) 232 (see FIG. 2b) as will be explained below. The VSP 208 is the preferred call control node because of its low cost, simple architecture and dedicated function. The ISTP 232 can be used, however, to implement the invention as can other intelligent processors connected to the common channel signaling network of the PSTN and assigned a point code as if they were a switching node or a signal transfer point in the network.

In each of the network configurations shown in FIGS. 5a–5d, a subscriber telephone 25 is connected to a network switching point 34 (hereinafter referred to as SP 34) by a subscriber line 27. The SP 34 is connected to the common channel signaling network and equipped at least with ISUP signaling capability. The SP 34 is capable of generating, sending, receiving and examining ISUP SS7 messages. For the purposes of this document, SP designates a network switching point as well as a network Service Switching Point (SSP) which is equipped to perform a TCAP query to an SCP. The SP 34 has a line side to which the subscriber line 27 is connected, and a trunk side from which a plurality of ISUP trunks such as ISUP trunk group 200 connect the SP 34 to other SPs in the network. For the purpose of clarity, only one other switching point in the PSTN is illustrated, an SP 36. Each SP 34, 36 is connected to the PSTN 202 in a manner well known in the art. The PSTN in turn includes a plurality of SPs which service a plurality of other subscribers.

In order to enable the invention to be practised in the network, selected SPs in the network are either equipped with EISUP trunks which are designated to route selected calls, or with ISUP loop-back trunks 234 (see FIG. 5c) which are reserved for that purpose. The EISUP trunks 212 and the ISUP loop-back trunks 234 are preferably ISUP trunk groups carried on DS1 or E1 facilities that respectively accommodate 24 and 30 voice channels. Each voice is referred to as a trunk member. The VSP 208 is connected to the common channel signaling network through an STP pair 204 using SS7 A-links 210, for example. As will be explained below in some detail, routing translations in SPs 34, 36 route selected calls onto the EISUP trunks 212 or loop-back trunks 234 which invokes ISUP messages to be sent using routesets and linksets associated with the trunk groups 212, 234 to the VSP 208 so that to the SPs 34, 36, the VSP 208 appears to be a switching node in the call path associated with those trunks. Since the VSP 208 serves as a virtual switching node in the call path, it is enabled to assume control of a call by treating other connections in the call path as controllable connections which may be released or reconnected as required using ISUP signaling messages which it generates, manipulates or modifies as required. The SS7 guidelines followed for the connection of the VSP 208 in the network conform to ANSI Standard T1.111.5-1994, paragraph 7.2. It should be noted that for simplicity of illustration, the Point Codes (PCs) in the drawings attached to this document do not follow the point code assignment convention recommended in ANSI Standard T1.118.8 where network point code 254 has been assigned to AT&T, 253 to U.S. Sprint and 245 to Telecom Canada. In actual practice, point codes are comprised of a network, cluster and a member number, with the cluster and member numbers assigned by the specific carrier where the network code has been allotted. Generally members 0 and 1 are reserved for STPs. For the sake of illustration, they have been used for SPs in the discussion which follows.

An Intelligent Peripheral (IP 214) is incorporated in the network shown in FIGS. 5a–5d to illustrate the versatility of routing that may be achieved using the methods and apparatus in accordance with the invention. By way of example, the IP 214 may be an Interactive Voice Response (IVR) platform. The IP 214 is connected to the SP 36 using a DS 0 trunk group 216 which has control coordinated with the VSP 208. Call routing coordination between the VSP 208 and the IP 214 is accomplished using a data network facility 226. Such a data facility may operate under any one of a number of data protocols well known in the art, such as SR 3511 AIN IP. The data network 226 may be an X.25 network, the Internet, an ATM network, or the like.

All calls handled by the VSP 208 are routed over the EISUP trunk group 212 in a manner which will be explained below in more detail.

Figure 5A:
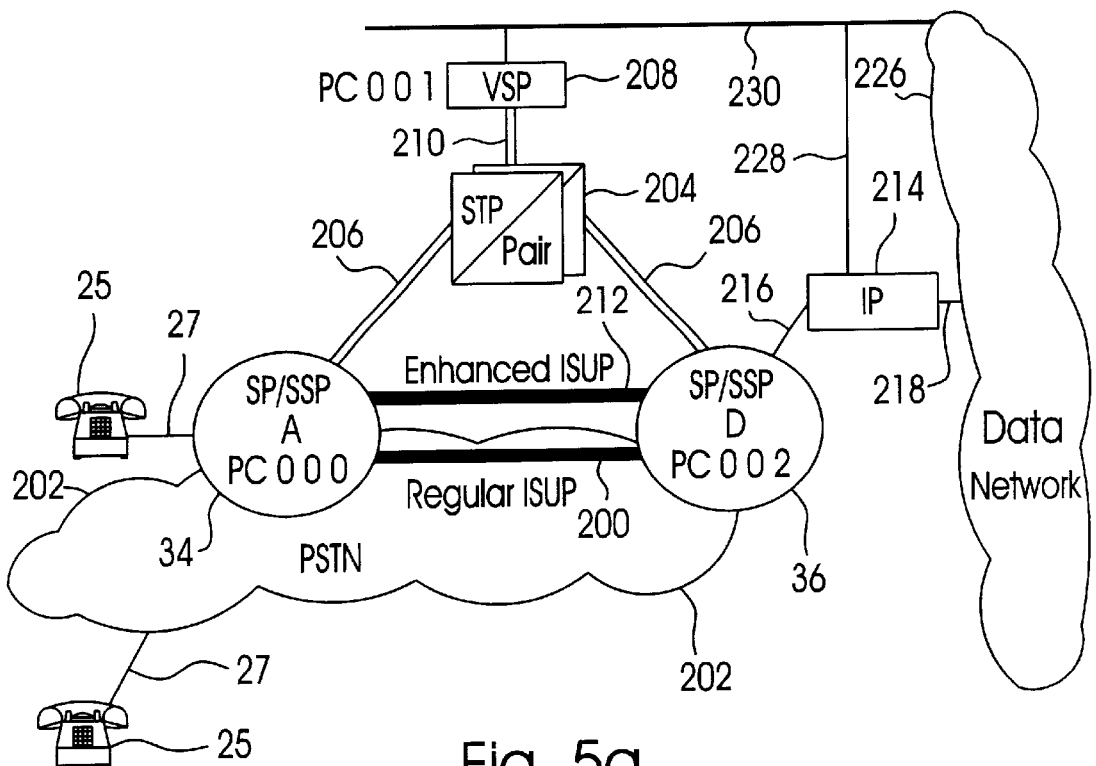
FIGS. 5a–5d are schematic diagrams of network configurations that may be used to implement call processing in accordance with the invention in the PSTN.
Figure 5B:
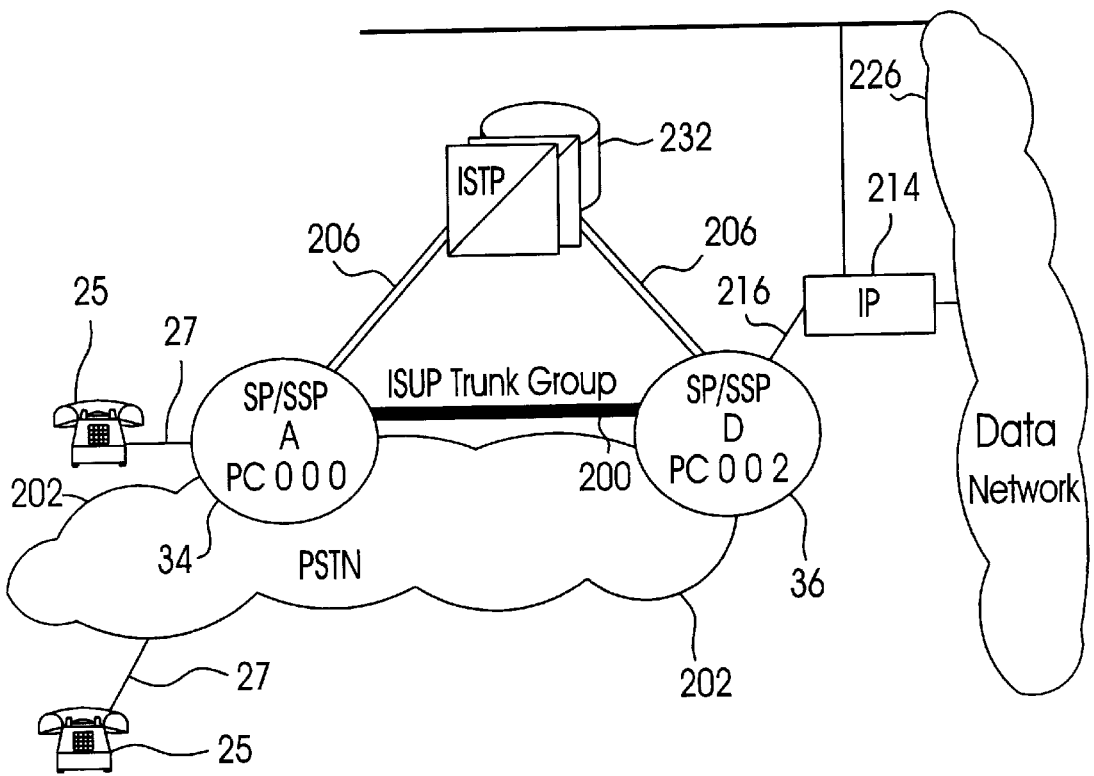

FIG. 5b shows another network configuration that may be used to implement the invention. In this configuration, the VSP 208 is replaced with similar functionality embedded in an Intelligent STP (ISTP) 232 as described in U.S. Pat. No. 5,586,177 which issued to Ferris et al on Dec. 17, 1996. Ferris et al describe an apparatus for introducing added functionality in the signaling network with an ISTP. The ISTP may be programmed to function as a call control node in accordance with the invention. With this network configuration, enhanced ISUP trunk groups are not required because call control messages are inevitably routed through one of the ISTP pair 232. It is, of course, necessary to program each ISTP in the pair identically. A disadvantage of using the ISTP 232 as a call control node is its relatively complex functionality as a Signal Transfer Point and the fact that it must efficiently handle a considerable message traffic load in addition to its functions as the call control node. While this configuration potentially reduces the number of trunk groups required in the network, triggers and call control algorithms must be incorporated into the complex ISTP software, which may introduce delays and costs similar to those associated with software development for network switching points. Implementations using the VSP 208 shown in FIGS. 2a, 2c and 2d are therefore preferred. Call routing using the ISTP 232 will be explained in further detail below.

Figure 5C:
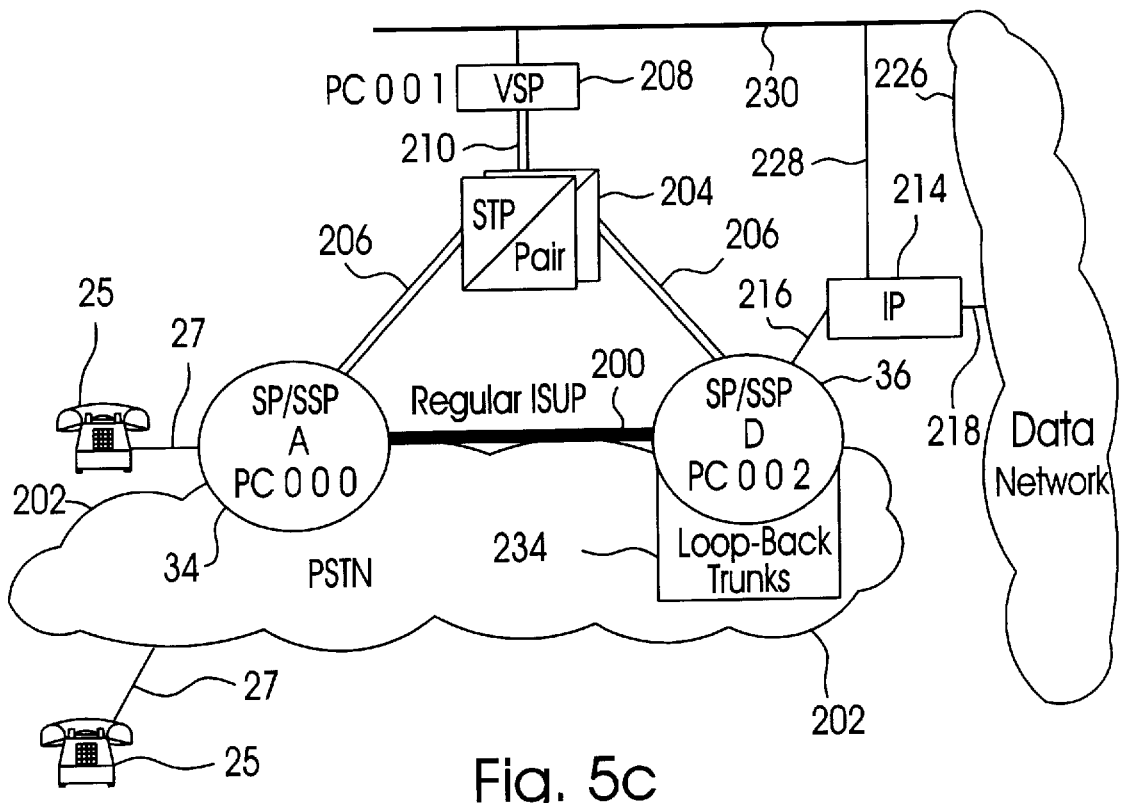

FIG. 5c shows another network configuration suitable for implementing the invention in a portion of the PSTN. All network elements shown in FIG. 5c are the same as those shown in FIG. 5a with the exception that EISUP trunks 212 are replaced by loop-back ISUP trunks 234. The loop-back trunks 234 are connected to the SP 36. This configuration consolidates the selected calls controlled by the call control node in accordance with the invention on the ISUP loop-back trunks 234, providing a centralized configuration for routing selected calls. VSP 208 operates in substantially the same way as with any other network configuration. Selected calls are routed by translation tables to the loop-back trunks 238 connected to the SP 36, which invokes the SP 36 to generate an ISUP IAM message that is forwarded to the VSP 208 as will be explained below in more detail.

Figure 5D:
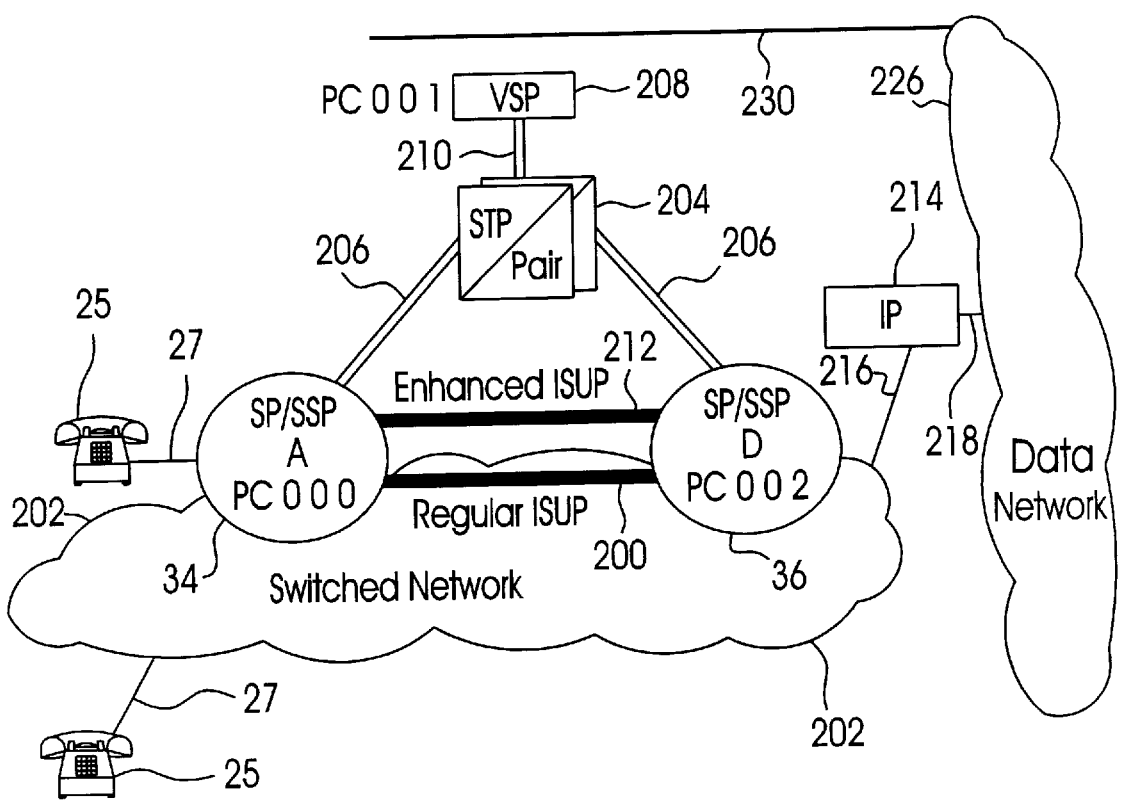

FIG. 5d shows yet another network configuration for implementing the invention. All network elements shown in FIG. 5d are identical to those shown in FIG. 5a with the exception that the IP 214 is not connected directly to SP 36. Instead, the IP 214 is connected to some other switch in the PSTN 202. This architecture is illustrated because it introduces certain complications into message associations which are readily dealt with but require special consideration. Practical solutions are set forth in the discussion that follows. In all other respects, the network configuration shown in FIG. 5d is the same as the network configuration shown in FIG. 5a.

Network Conditioning Message Transfer Part

Two basic configurations for implementing the MTP of SS7 may be used to implement the invention in the PSTN:

1) A call control node which is assigned a point code and appears in the network as a switching node to cause all call control messages to route to that node from the SS7 network, as disclosed in U.S. Pat. No. 5,377,186. If loop-back trunks 234 are used, 2 point codes can be assigned to the VSP 208 to permit the same CIC to be assigned to each end of each loop-back trunk member, as will be understood by those skilled in the art. Alternatively, if the SP 36 (see FIG. 5c) supports multiple point codes, two point codes can be assigned, to the SP 36 permitting the loop-back trunk member ends to terminate on different point codes in the SP 36, as will also be understood by those skilled in the art. As a further alternative, different CIC codes can be assigned to each end of each loop-back trunk member in such a way that the VSP 208 can be programmed to compute a CIC when responding to an ISUP message. For example, the opposite ends of a loop-back trunk member may be assigned sequential CICs and the VSP 208 can be programmed to increment the CIC in an ISUP message by one, as will also be understood by those skilled in the art. Other algorithms may also be used for CIC assignments for loop-back trunk members.

2) SS7 communication with the VSP 208 can also be accomplished using F links, in which case loop-back trunks 234 would be the most practical implementation for the designated ISUP trunk groups on the SP. The routing methods described above for loop-back trunks may be used for controlling the loop-back ISUP trunks. However, this option is not preferred because the implementation for ISUP routing is identical to the first option, and efficiency is sacrificed. Besides, if F links are used, an F link connection to a call control node is required from every SP/SSP on which the invention is to be implemented.

ISUP Trunk Set-Up

FIGS. 5a and 5d depict the configurations in which inter-switch EISUP trunk groups are established. The physical trunk links are established between SP 34 and SP 36. Virtual trunk links are established between SP 34 and the VSP 208 by creating a routeset that directs all selected outbound calls to the enhanced ISUP trunk group virtually connected to the VSP 208. A corresponding virtual trunk group is set-up between the VSP 208 and SP 36, by creating a similar routeset between the VSP 208 and SP 36.

Virtual trunk groups are established in much the same way for the loop-back trunks 234 (see FIG. 5c) where virtual trunk groups are established between each end of a loop-back trunk group in SP 36 and the VSP 208. If, as described above, two point codes are used in either the SP 36 or the VSP 208, as will be explained below in more detail, two routesets are required to the VSP 208. Alternatively, CIC codes may be incremented using a suitable algorithm, as described above and explained below in more detail. In that case, a single routeset can be used.

When the VSP 208 is configured in the network as a virtual node using either the enhanced ISUP trunk group configuration or the loop-back trunk group configuration, the trunk groups must be set-up as a part of network conditioning. Logic is therefore required in the VSP 208 to permit certain network signaling messages to pass transparently through the VSP 208.

EXAMPLE 1

When a continuity message is sent during the initial turn-up of a trunk or during trunk seizure in establishing a call, an action to send back tones or loop a facility is required at the far end of the physical termination. This requires that the VSP 208 modify the point codes in the message and pass the message on without other modifications to invoke the expected action at the terminating end of the physical trunk. Failure to perform this action would result in the generation of a failed trunk condition at the originating end of the trunk, which would cause the trunk to be removed from service. The VSP 208 must modify the point codes (and in some cases the CIC code as explained above) so that the forwarded message will reach the switch on the terminating end of the trunk to permit the required action to turn up the seized trunk.

EXAMPLE 2

Blocking and Unblocking messages must be transparently passed through the VSP 208, again with point code and, in some cases, CIC modifications as required to ensure conditions at both end of the physical facilities are aligned.

Only certain messages required for enhanced call control are substantially changed by the VSP 208.

Routing Translations

In order to practise the invention, the routing of selected calls must be controlled by the call control node. If the call control node is a VSP 208, another component of the network conditioning required to enable use of the invention is certain changes to routing translation tables in the SPs of the PSTN in which the invention is to be implemented. Standard translation methods and standard translation tables may be used to implement the routing requirements of the invention.

When a telephone number is dialed in an AIN network, the dialed digits are examined to determine how to route the call. The routing decision is made by consulting routing tables which direct the switching system to select a specific outbound trunk group for the call if the call is not to a called party serviced by the switching system. Under certain conditions a dialed number will trigger an AIN switching system to formulate a TCAP message containing the dialed digits and dispatch the TCAP message to a database for a conversion of the dialed digits to another number. On receipt of the converted number, the switching system consults its routing tables to determine a trunk selection for the call.

When the network is conditioned to practise the invention, it is therefore necessary to create entries in the routing tables of enabled SPs to ensure that selected calls are routed to a trunk group having a virtual connection to the VSP 208. The SS7 routeset associated with the trunk group will direct signaling messages related to the call through the VSP 208, which will permit the VSP 208 to thereafter control the call, as will be explained below.

The selected calls will normally be routed to the call control node based on the dialed digits or a translation of the dialed digits. They may also be routed to the call control node using prior art translation methods based on calling line identification to permit special services to be developed for individual subscribers, companies, corporations or the like.

Trunk Selection Criteria—Glare

Glare involves trunks which can be seized from either direction and is a condition which occurs when each end of a specific trunk is seized at the same time. Glare is a potential problem with inter-switch EISUP trunk groups if the trunk group is equipped for outbound calls on each SP. This problem is easily resolved by designating at least two inter-switch EISUP trunk groups and equipping the trunk groups as outbound only trunks from the respective switches. This is the simplest option for eliminating glare.

However, it is advantageous from a network utilization perspective to use two-way trunks which can be seized from either SP. There are several known switch routing algorithms which reduce anticipated glare by causing different trunks to be selected at each end of a trunk group, clockwise, counter clockwise being a good example. Using this algorithm, the last idled trunk is located, which should be the same trunk member at each SP, and one SP steps clockwise to the next available trunk while the other SP steps counter clockwise to the next available trunk when selecting an idle trunk for a new call.

If both ends of the same trunk member are seized at the same time, a convention is used to determine which switching system is obligated to step down and select another trunk member. The VSP 208 may be the office in control and both SP 34 and SP 36 be obliged to step down, but this situation is more efficiently handled like other management issues where messages are passed transparently through the VSP 208 and either SP 34 or SP 36 is dominant and the subordinate office steps down.

Number Portability

Number portability is being or has been implemented in much of the PSTN. Number portability can give rise to a situation in which the dialed number is a ported number or the VSP 203 attempts to redirect a call to a ported number. In certain number portability implementations, a terminating switch will return a Release With Cause="LNP" or the like, which is intended to advise the originating switch that the number is a ported number, and that a database lookup is required to retrieve the physical address of the called party. In this instance, the Release with Cause cannot be passed back to the originating switch because its records show that it has a completed call up and it would have no procedures to deal with receipt of the message. The VSP 208 must therefore be enabled to deal directly with number portability. Consequently, the VSP 208 may be equipped with either TCAP capability, or be enabled to query SCPs using its data network interface 306 (see FIG. 4a) and a protocol such as SR 3511 AIN IP, or the like, as will be well understood by persons skilled in the art Alternatively, translations are available which indicate adjacent switch capabilities. This provides a mechanism to permit TCAP enabled SPs to perform number portability queries at a point prior to the VSP in the release sequence.

Billing Requirements

Billing is also a consideration for enhanced services and many special service calls are billed based on call volumes. The overall duration of a total call will be available in the originating SP (34, 36) and existing LAMA toll free billing routines may be used when appropriate. If subsequent call information is required, that information may only be available to the VSP 208 and the SP (34, 36) at the terminating end of the EISUP trunks 212, when loop-back trunk groups are not used for selected call routing. In those circumstances, at least two viable options exist for billing.

1) Billing on the SP: Existing billing options available in the SP on the terminating end of the ISUP may be able to generate billing records with appropriate modules appended to identify call types with specific information. If such modules do not exist, switch modifications may be required to permit billing to be performed at that SP. The advantage of billing at the SP is that most SPs already interface with billing platforms and support the expected formats.

2) VSP Billing: The VSP 208 controls selected calls routed through the network over the EISUP trunks and has access to all information relating to duration, called party, calling party (where available) redirected number, etc. The VSP 208 therefore has all the information required to generate billing records and can be programmed to compile the call records into any Bellcore AMA Format (BAF) record that may be required.

Billing algorithms are well know in the art and many examples exist for IP or SP billing. The billing number must be associated with the subscriber, and can be inserted into the charge number field of an IAM.

Implementation

Control and Message Alignment

In real world implementations of the invention, the VSP 208 may be required to handle tens or hundreds of selected calls concurrently. One purpose of this invention is to permit a new level of call flexibility by enabling a call to be redirected from one called party to another any number of times without disconnection of the calling party. In order to accomplish this, the call control node must have at its disposal at all times a unique identification of each call in progress. Furthermore, call redirection instructions will normally be received from an external source, such as a data message received through the data network interface 306 (see FIG. 4a). It is therefore important to coordinate the release and re-establishment of the egress circuits under the control of the VSP 208. This is required to ensure that the correct outbound trunk is released at the SP on the terminating end of the EISUP trunk to permit a call to be redirected to a subsequent destination. In order to control concurrent calls, the VSP 208 must be provided with a mechanism for call tracking which permits it to determine with which call any given ISUP signaling message is associated, and which egress trunk member the SP at the terminating end of the EISUP trunk group selected for the call. This requirement is complicated by the fact that Automatic Number Identification (ANI), normally found in the calling party field of ISUP messages, is not always available. For example, some PBXs do not supply ANI, or supply the same ANI for all calls. Several options exist for the coordination and tracking of messages and these options can be tailored depending on the configuration of the serviced facility.

Individual Directory Numbers Associated Single Terminations

This option is the simplest to control and implement and can be used in configurations where each termination within a switched telephone network is likely to be unique. This option can only be used for certain service applications, however, because in the network at large two or more callers may be connected to the same number (a PBX for example) at the same time. There are, however, services for which this option can be used. For example, applications for enhanced call handling where each agent has a distinct telephone number that is exclusively associated with that agent, as in the case of certain call centers, coordination of data messages with calls in progress is accomplished by matching data address (TCP/IP address) and telephone network address (called party number).

related data information to the same location. This invention capitalizes and augments their work.

Individual Dialed Numbers Associated With Groups of Terminations

If the apparatus and methods of the invention are used to enhance services provided to a call center operated from a PBX or an Automatic Call Distributor (ACD), for instance, or an Intelligent Peripheral such as an IVR where one dialed number may terminate to a group of trunks, call tracking may be accomplished by assigning a block of numbers to the termination which is equal to the number of facilities for handling calls. On receipt of a call in which the dialed number indicates such a termination, the VSP 208 selects the next available number from the assigned block of numbers and inserts it in the dialed number field in place of the original dialed number before forwarding the IAM. If all available numbers are in service, the VSP 208 immediately returns an REL message to the originating SP and drops the

TABLE I

| Called Party Number | CLID | Service Application | SS7 Information | TCP/IP Address |
|---|---|---|---|---|
| From ISUP IAM | From ISUP IAM | Subscriber Identification and Service type | Oc, DPC, CIC | 196.96.205.145 As per RFC 793 and 791 |

There is a direct correlation between the Directory number associated with each called party member, ISUP Called Party Number, GR 246 T1.113.3 and the TCP/IP address to or from which associated data messages are delivered or received. Either Centrex or individual telephone lines can be utilized with this method of call tracking. This method cannot be used for tracking calls associated with an IP because more than one line is assumed to be required to service the IP and so multiple calls would terminate to the same number.

The TCP/IP address shown in Table I can be a dedicated address in the Internet or an Intranet, or where a TCP/IP address is shared, a unique user or station Identification may be appended to the message. Data packets containing caller information can be delivered to the same location as the voice component of the call once a TCP/IP address associated with the call is returned to the VSP 208 with enough information to permit the VSP 208 to match the TCP/IP address with a call in progress. In this example, the called number would suffice. There are many companies with products that coordinate the delivery of voice calls and call or places the call in a waiting queue. Otherwise, the VSP writes a call control table entry and forwards the IAM containing the new dialed number.

Table II shows an example of a call control table that can be used in this situation.

TABLE II

| Called Party Number | CLID | Service Application | SS7 Information | TCP/IP Address |
|---|---|---|---|---|
| Number selected from block of numbers | From ISUP IAM | Subscriber Identification and Service type | OPC, DPC, CIC | 196.96.205.145 As per RFC 793 and 791 |

The Intelligent Peripheral or Call Center is provided with Dialed Number Identification Service (DNIS) and the terminating SP extracts the dialed number from the IAM and forwards it over the terminating trunk. The dialed number may then be returned to the VSP 208 in a TCP/IP message, which permits the VSP 208 to coordinate the TCP/IP address with the dialed number so that the VSP will know which call to reroute if it receives a redirection message from that TCP/IP address. If the TCP/IP address is shared, the dialed number must be saved and returned along with the redirect instructions to permit the VSP 208 to reroute the call.

Incremented Calling Numbers for Duplicate CLIDs for Group Terminations

This is an alternate solution to the problem discussed immediately above where a single telephone number terminates to a plurality of terminations on one or more trunks and the called number cannot be used to uniquely identify a call. With this option, Calling Line Identification (CLID) is used to uniquely identify each call.

This option capitalizes on unique CLIDs where calls are from unique calling party locations identified by a unique calling party address in a switched network. CLID is used to match a physical call with data information about that call. Certain calls do not provide unique CLID information, however. Calls which do not provide unique location identifiers (CLIDs) include PBX locations where extensions are used, calls from non-SS7 equipped offices, key systems or private numbers (Private numbers cannot be passed outside the PSTN network). With calls from these locations there is the potential of receiving what appears to the VSP 208 to be duplicate calls. Providing a unique reference number for these calls is accomplished by incrementing the CLID by a predetermined value, such as 1 for each occurrence of a duplicated CLID. The incremented number may be reset after it reaches a predetermined value that is great enough to ensure that no duplication occurs.

Table III shows an example of a call control table that can be used to implement this solution.

TABLE III

| CALLED NUMBER | CLID | Service Type | SS7 Information | TCP/IP Address |
|---|---|---|---|---|
| From ISUP IAM | Calling Party Number or unique number if CLID is duplicated | Subscriber Identification and Service type | OP, DPC, CIC | 196.96.205.145 As per RFC 793 and 791 |

See the discussion above for TCP/IP address treatment.

Routing Examples for Selected Calls

In order to illustrate call routing using the apparatus and methods in accordance with the invention, several examples of routing are provided in the description that follows. An IP in the form of an IVR is used for the purpose of illustrating a simple service that may be developed. As noted above, it will be readily appreciated by persons skilled in the art that the invention can be used to implement a vast array of services.

For the sake of clarity in the drawings, call setup, mid-call processing and call disconnect sequences are shown in separate drawings, and to eliminate duplication replicated sequences are shown in only one drawing, as will be explained below.

Figure 6A:
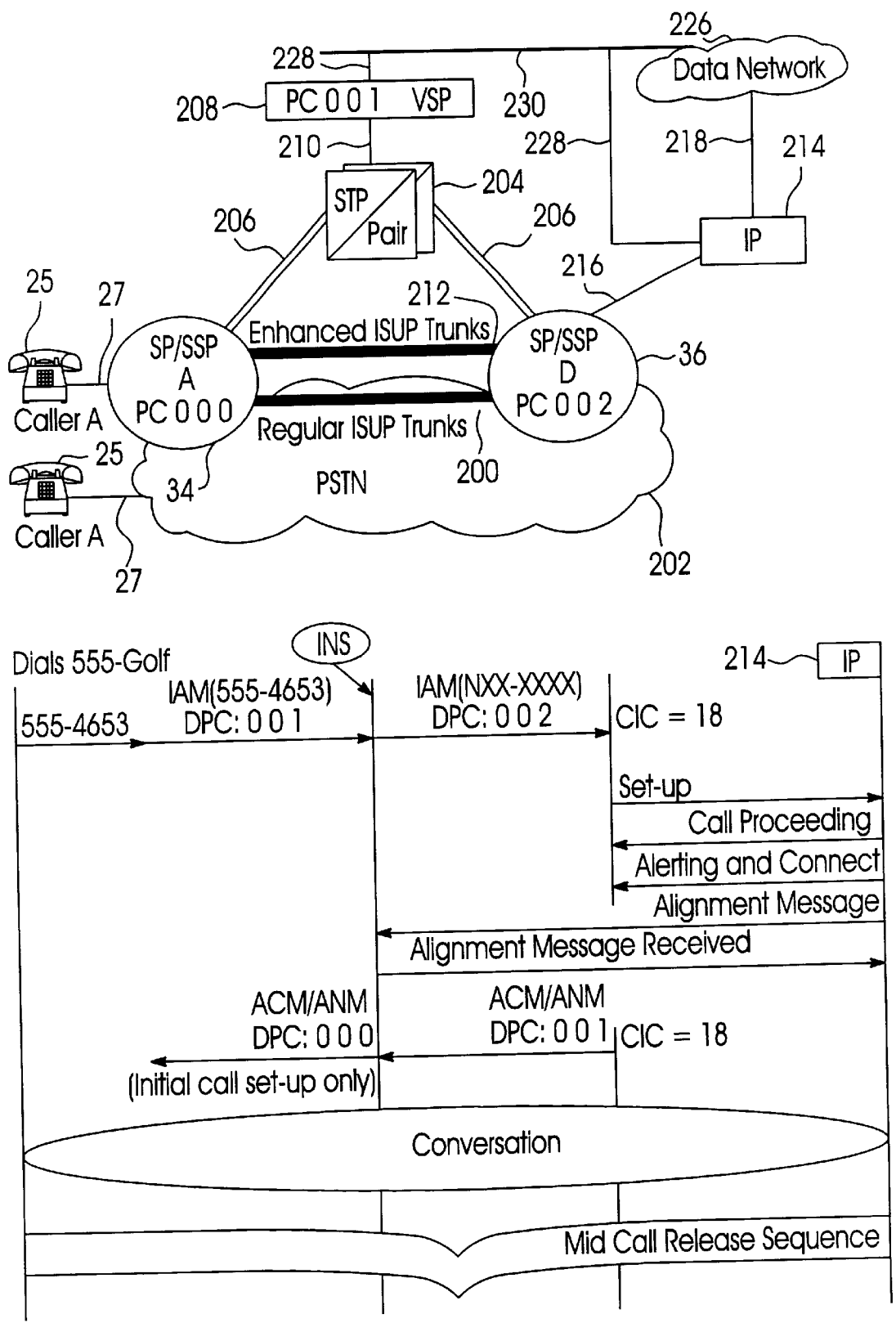

FIG. 6a shows Caller A at telephone 25, attached to either SP 34 or switched network 202 by subscriber line 27. In response to an advertisement in a local newspaper, Caller A dials 555 GOLF (555-4653). The digits may be received by SP 34 either from the line appearance on SP 34 or from the switched network 202. 555-4653 may also be a translated number received by SP 34, translated, for example, from 1-800-555-GOLF, which is a toll free number to the caller without a directly associated physical termination in the network. Examples of 800 number call processing are described in U.S. Pat. No. 4,191,860 to Weber. Standard switch translations are used to traverse the switched telephone network 202 following standard routing conventions used in the network and known to those skilled in the art. The North American Number Plan is the most common number plan in use within the PSTN, but other address identification options such as switch and trunk identification are also used for call routing.

Routing translations in SP 34 are structured to recognize "555" as a selected call and the call is routed to the EISUP trunk group 212 reserved for such selected calls. Standard routing conventions are used to accomplish this. Other calls routed to the SP 36 are routed using regular ISUP trunks 200. The EISUP trunk group 212 can also be used as an overflow trunk group for regular calls.

To complete the selected call 555-4653, the SP 34 searches for an idle trunk member in trunk group 212 and seizes CIC 18, which it finds to be idle. SP 34 then assembles an ISUP Initial Address Message (IAM) with an Originating Point Code (OPC) 0 0 0, a Destination Point Code (DPC) 0 0 1, and a CIC 18, identifying the next available idle trunk in a virtual trunk group between SP 34 and the VSP 208. The ISUP IAM message is forwarded to the VSP 208 via SS7 signaling links 206 between the SP 34 and the STP pair 204 and on SS7 signaling links 210 between the STP pair 204 and the VSP 208. The VSP 208 extracts the number 555-4653 from the IAM message and uses the number in a table lookup to determine the service which the caller is accessing. The table indicates that the number 555-4653 is to be translated to 777-4653, the number associated with the IP 214. Table IV shows an exemplary dialed number translation table.

TABLE IV

| DIALED NUMBER | | | | | |
|---|---|---|---|---|---|
| DN | CLID | TOD | DOW | SERVICE NO. | SERVICE CODE |

In the dialed number translation table, the called number received is located in the table. All or a portion of the calling line identification (CLID) may be used in the translation, for example for regional call routing or the like. A dialed number may therefore have one or more entries in the table. Other variables such as time of day and/or day of week may also be used in the translation. There are many other options for routing that may require other variable fields not illustrated in the table. When the variables are all matched in Table IV, a Service Number and a Service Code are located. The Service Number determines the termination for the call and the Service Code is used in subsequent routing decisions, as will be explained below.

The VSP 208 modifies the called number in the ongoing IAM message to the service Number, and uses the service code to determine the routing to be applied to the ISUP message. Table V shows an exemplary common channel signaling translation control table.

TABLE V

COMMON CHANNEL SIGNALING

| SERVICE CODE | MESSAGE TYPE | INCOMING PART | | OUTGOING PART | |
|---|---|---|---|---|---|
| | | OPC | DPC | OPC | DPC |

The common channel signaling control table permits a call control mode to perform the message addressing and routing function. The service code is derived from the dialed number translation table as described above. The message type is extracted from the message type field. The incoming part identifies where the message originated and where subsequent messages will be returned. The outgoing part indicates where the message is to be sent and from where subsequent messages will be received. The common channel signaling control table helps to keep service logic in the call control node as generic and flexible as possible. Other variables may be added to the table if required.

The VSP 208 uses the common channel signaling control table to determine that the OPC of the message should be changed to 001 and the DPC should be changed to the DPC associated with SP 36, PC 0 0 2. A call control table entry for the call is then created using any of the options described above in the Call Control and Message Alignment section for uniquely identifying the call The call control table is dynamically maintained on a per call basis and provides details on current call status for each call in progress. A preferred structure for the call control table is shown below.

TABLE VI

| Routing Table | | | | | | | |
|---|---|---|---|---|---|---|---|
| Serial Number | CLID | OPC | DPC | CIC | Service Number | Action Code | TCP/IP |

Serial Number: Each call routed to a termination is assigned a serial number which is used to coordinate call control messages.

CLID: May be used for initial call identification as described above, and is required in subsequent calling for billing information.

Common channel signaling point codes: The OPC stored is associated with the originating portion of the EISUP trunk. The DPC is associated with the terminating portion of the EISUP trunk. The CIC identifies the number of the trunk group which is used for the call. The combination of this information is required for subsequent actions on the call as controlled by the call control node.

The service number is the number which is used for routing to a destination. It is derived from the dialed number translation table when an IAM is received at the call control node. It is normally supplied from an external source such as a data network after an initial termination for a call is set up.

The action code is call control information received either from the switched network or via the data network to drive the next action taken by the call control node.

TCI/IP address is used for any communication between the call control node and a call termination. It is updated each time the service number is changed, and may be blank.

The VSP 208 re-compiles the IAM message and emits it into the common channel signaling network where it is forwarded over the routeset between the VSP 208 and SP 36.

SP 36 receives the IAM associated with CIC 18 from VSP 208 and uses regular translation tables and procedures for routing to 777-4653, which are well known in the art. The translation tables instruct the SP 36 to reserve line 216 which is connected to the IP 214, in this example an ISDN line. SP 36 forwards information associated with the call to IP 214 in an ISDN set-up message. The IAM parameters are directly mapped into the ISDN set-up message, permitting the information contained in the message to be used to define the service to be applied in the IP 214.

ISDN call processed, alerting and connect messages are then sent from IP 214 to SP 36 which translates the messages into an ISUP Address Complete (ACM) and Answer Messages (ANM) that are sent back to the VSP 208. While the voice path is being established a call alignment message is generated by IP 214. The alignment message preferably includes dialed number, CLID and IP address. The data messsage is transmitted over data line 218 to the data network 226 from the IP 214 and forwarded from the data network 226 over data line 228 to the VSP 208. On receipt of the alignment message, the VSP 208 locates a corresponding entry in the call control table described above and on finding a match generates a unique serial number which is recorded in the table and returned to the IP 214 in an acknowledgement message. The serial number is then associated with the balance of the call regardless of the number of sequential terminations to other numbers, as will be described below. This exchange of information sets up the data link for the subsequent release and transfer of the call where subsequent routing is required. Messages may be formatted as shown in FIG. 4b where the data portion 301 of a TCP/IP message 300 includes the Serial Number, CLID, Service Number, TCP/IP address, and a reconnect number at times when call rerouting is requested. Upon receipt at the VSP 208 of the ACM and ANM messages from SP 36, a log is preferably made that the call has been answered and the ACM and ANM messages are modified as required using the common channel signaling control table and forwarded to SP 34 which provides the complete path and allows the call to commence an interactive session with the IP 214.

VSP to IP Through Switched Network

FIG. 6b shows yet a further configuration for a switched network for completing selected telephone calls where routing through the PSTN is required to reach the IP 214. As described above in the previous example, SP 34 assembles an ISUP IAM with an Originating Point Code (OPC) 0 0 0, a Destination Point Code (DPC) 0 0 1, and a CIC 18, identifying the first currently available trunk in the virtual EISUP trunk group 212 between SP 34 and the VSP 208. The called number forwarded in ISUP IAM is, for example, 555-4653. The ISUP IAM message is forwarded to the VSP 208 via SS7 signaling links 206 between the SP 34 and the STP pair 204 and on SS7 signaling links 210 between the STP pair 204 and the VSP 208. From the IAM message, the VSP 208 determines, using the called number in a dialed number translation table look-up, the subscriber and the service which the caller is accessing. That table also converts the called number 555-4653 to a service number 777-4653, the destination number associated with the IP 214, and the VSP 208 changes the called number in ongoing IAM message accordingly. The common channel signaling table indicates that the OPC should changed to the PC of the VSP 208 (PC 0 0 1) and the DPC should be changed to the PC of the SP 36, (PC 0 0 2). A call control table entry is created for the call as described above.

The VSP 208 then re-compiles the IAM message and forwards the newly recompiled IAM over signaling links 206 to SP 36. SP 36 receives the IAM associated with CIC 18 and applies regular translations for routing to the converted called number, 777-4653. The translation tables instruct SP 36 to route the call through the PSTN 202 to an SP which serves the IP 214. SP 36 therefore reserves an outgoing trunk connected to the PSTN 202, as specified in the translation tables, and modifies the IAM to include its point code in the OPC and a point code specified by the routeset for the reserved trunk group in the DPC. The CIC of the seized trunk is inserted into the CIC of the IAM. The IAM is then emitted into the SS7 network where it directly or indirectly reaches the SP which serves the IP 214. At the SP which serves the IP 214, IAM parameters are directly mapped into an ISDN set-up message, as described above. The information contained in the message is used by the IP 214 to define the service to be provided to the calling party.

ISDN call proceed, alerting and connect messages are then returned from IP 214 to the SP which serves it. That SP translates the messages into ISUP address complete (ACM) and answer messages (ANM) which it sends in turn through the switched network to the SP 36 and the VSP 208. While the voice path is being established through the PSTN, an alignment message is sent from IP 214 to the VSP 208 via the data network 226. This exchange of information supplies or confirms the IP address of the IP 214 to the VSP 208 to enable the subsequent release and transfer of the call if subsequent routing is required, and supplies IP 214 with a unique serial number identifier for the call as described above. The message format preferably conforms one of the options described in the Call Control and Message Alignment section. Upon receipt of the ACM and ANM ISUP messages at the VSP 208, a log entry is written that the call has been answered and the ACM and ANM messages are modified as described above and forwarded to SP 34 which completes the voice path that permits interaction between the calling party and the IP 214 to begin.

VSP Direct to IP Using Loop-Around Trunks

FIG. 6c is a simplified diagram showing call setup processing for the network configuration in which the VSP 208 serves as the call control node for an SP 36 equipped with ISUP loop-back trunks 234. As explained above in some detail, the invention may be implemented using a network configuration in which one or more SPs in the network are equipped with ISUP loop-back trunk groups for routing selected calls. The function of the ISUP loop-back trunk groups is to route the selected calls through the call control node, in this case VSP 208. This is accomplished using standard translation tables and methods in a manner well known in the art. Call processing proceeds very similarly to the examples described above in that when caller A dials the number such as 555-4653, which digits may be received from a line appearance 27 in SP 36 or may be received in an ISUP IAM message received at SP 36 through the PSTN 202. In either instance, translation tables in the SP 36 route the call to an outbound end of the ISUP loop-back trunks 234 and the SP 36 reserves an idle trunk member of the group. A routeset associated with the trunk group directs SP 36 to formulate an IAM having an OPC of 000 and a DPC of 001. The SP 36 compiles the ISUP IAM and emits it into the SS7 network on A-links 206 where it is transmitted to STP pair 204 and forwarded over A-links 210 to the VSP 208. The VSP 208 handles the message as described above, using look-up tables to determine the service number and the service code associated with the service which the caller is accessing. The common channel signaling control table also instructs the VSP to change the OPC in the IAM to the DPC and the DPC to the OPC. That look-up table also provides an appropriate CIC so that the inbound end of the loop-back trunk member reserved by the SP 36 is seized on receipt of the IAM. The dialed digits may also be converted during this processing, depending on the service accessed, as described above.

The VSP 208 compiles the modified IAM and emits it back to the SS7 network where it is returned via A-links 210 and 206 to the SP 36. The SP 36 receives the IAM as an inbound call request and seizes the inbound end of the ISUP loop-back trunks indicated by the CIC of the IAM. The SP 36 then consults its routing tables to determine where the call should be routed. In this instance, the SP 36 determines that the call should be routed to IP 214, which it serves. The IP 214 is connected by an ISDN link 216 to the SP 36 and the ISUP call parameters are mapped into an ISDN setup as described above. As also described above, ISDN call proceeding and alerting and connect messages are generated by IP 214. An alignment message is also exchanged between the IP 214 and the VSP 228 via data network 226. Concurrently, the SP 36 maps parameters from the ISDN, call proceeding, alerting and connect messages into ACM and ANM ISUP messages which are dispatched to the VSP 208 via the STP pair 204. The VSP 208 again consults its look-up tables and reverses the point codes as described above and adjusts the CIC accordingly. The ACM and ANM messages are then dispatched back to the SP 36 to complete the voice circuit between the calling party and the IP 214 so that interaction between the two may proceed, as will be described below in more detail.

Similarly, if the IP 214 were not connected directly to the SP 36 but were connected to another switch in the PSTN 202, call processing would proceed as described above with the exception that rather than addressing the IP 214 directly, the SP 36 would consult its routing tables and recompile the IAM message accordingly before emitting it into the PSTN where it would be forwarded to the switch that serves IP 214 as described above with reference to FIG. 6b.

ISTP as a Call Control Node

FIGS. 6d and 6e show call setup processing in network configurations in which an ISTP 232 serves as a call control node in accordance with the invention. As explained above, EISUP trunks are not required if an ISTP serves as the call control node in accordance with the invention. The only network conditioning required is the programming of each ISTP enabled to serve as a call control node. Each ISTP that serves as call control node must be programmed to examine every ISUP message it processes to determine whether the ISUP message relates to a subscribed service accessed by a selected call. For example, if caller A using telephone 25 dials the digits 555-4653 and the dialed digits are received either directly through a line appearance of line 27 or via the PSTN 202, SP 34 consults its translation tables and determines that the call should be forwarded to the SP 36 over regular ISUP trunks 200. The SP 34 therefore reserves an idle member of regular ISUP trunks 200 and formulates or recompiles an IAM which is forwarded over A-links 206 to ISTP 232. The ISTP 232 examines the IAM and determines that it relates to a selected call in accordance with the invention. The ISTP 232 therefore creates a call control table entry indicating that a selected call request has been received but otherwise passes the IAM transparently over A-links 206 to SP 36. On receipt of the IAM, SP 36 consults its routing tables and determines that it serves the called number which may be the dialed digits or may be a converted number changed by ISTP 232 using the dialed number translation table as described above. SP 36 maps the IAM parameters into an ISDN call setup message which it forwards to IP 214.

The IP 214 returns an ISDN call proceeding message and an alerting and connect message. The IP 214 also prepares and dispatches a data message over data link 218 to the data network 226 which forwards the data message over data link 228 to the ISTP 232 to provide the ISTP 232 with the IP address of the IP 214, which may not be available at the ISTP 232. On receipt from IP 214 of the ISDN call proceeding and alerting and connect messages at SP, the SP 36 formulates and dispatches ACM and ANM ISUP messages to SP 34 which it dispatches over A-links 206 to ISTP 232. The ISTP 232 examines the messages and writes a log to indicate that the call has been answered. It then transparently forwards the messages over A-links 206 to the SP 34, completing the connection to permit interaction between the caller A and the IP 214, as will be described below in more detail.

FIG. 6e shows a similar call setup sequence in which the ISTP 232 serves as call control node in accordance with the invention but the IP 214 is served by a switch in the PSTN 202. All ISUP message processing by the ISTP 232 is as described above. The only difference in the call setup sequence is that when SP 36 consults its routing tables on receipt of the IAM from SP 34, it determines that the called number is served by an SP elsewhere in the PSTN. Therefore it recompiles an appropriately modified IAM and emits it into the PSTN which is routed to the SP that serves IP 214. Thereafter, call setup proceeds as described above.

Mid-Call Sequences

As explained above, one purpose of the invention is to permit a portion of a call to be torn down and rerouted without disconnection of the calling party. The examples which follow describe call sequences in which the called party is disconnected and the call is rerouted to another called party. It will be understood by those skilled in the art that the invention permits a situation in which the calling party is disconnected and the call is rerouted under the control of the called party to a new termination.

Figure 7C:
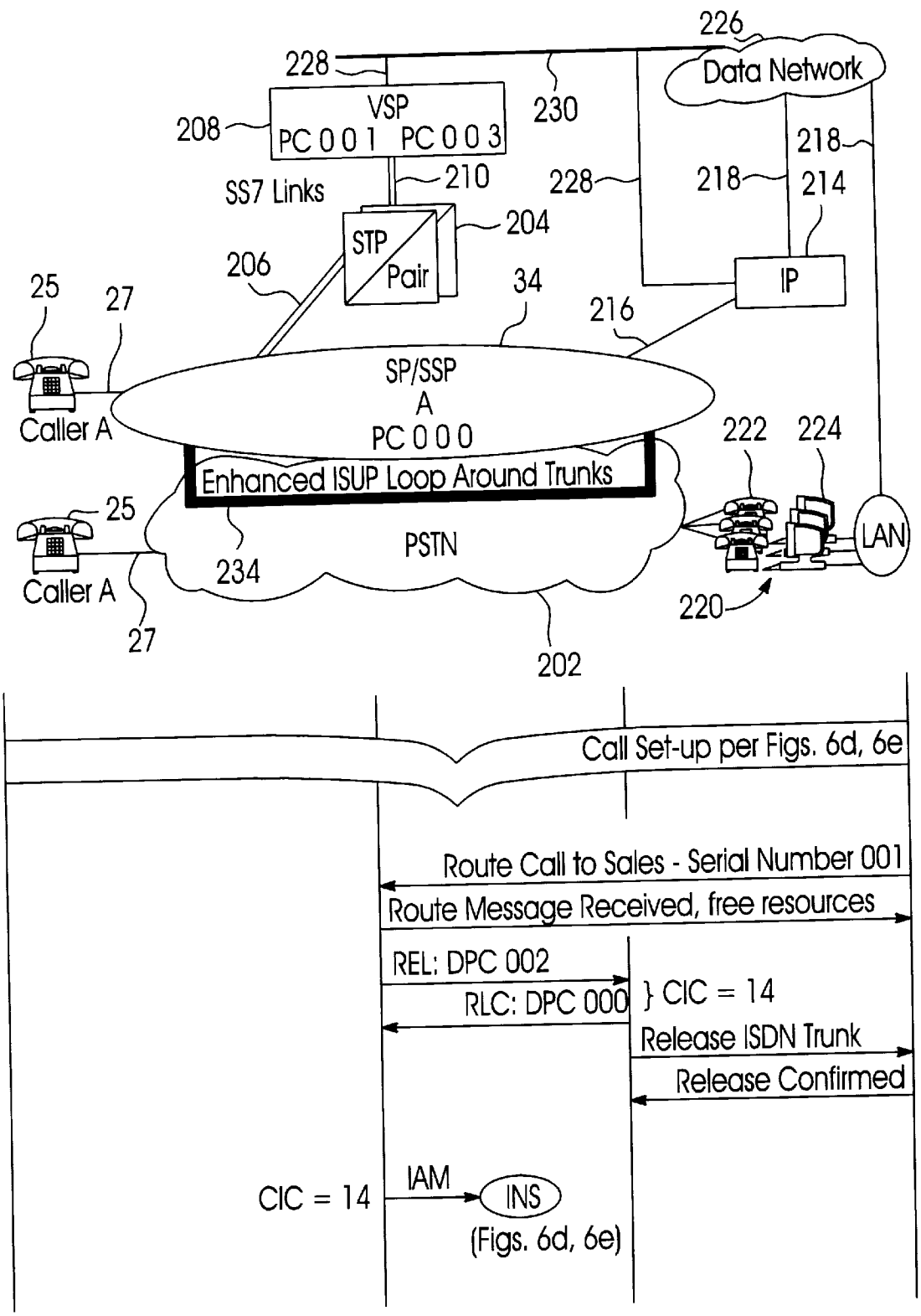

FIGS. 7a–7c illustrate three mid-call sequences which follow the call setup sequences illustrated in FIGS. 6a–6e. In this example, interaction is with an IP 214. As will be understood by those skilled in the art, interaction could also take place with a person at a call center or the like. In either instance, the results are substantially the same. In this example, during the interaction between the caller A and the IP 214, caller A, for example, enters selections which indicate to IP 214 that caller A desires to speak to a sales representative of the subscriber to the service. In accordance with prior art processing, the IP 214 would typically include a front end switch which routes the call back out into the PSTN to the sales representative and bridges the calling party to the new termination, thus occupying many duplicated facilities and wasting PSTN resources. In accordance with the invention, on receipt of caller A's request during the interaction which ensued after call setup, the IP 214 instructs the call control node of caller A's request and the call is rerouted from the call control node, permitting most efficient use of PSTN resources. This sequence may be repeated any number of times so that, for example, if caller A decides in conversation with sales to acquire a membership, sales can send a message through data network 226 to the call control node to reconnect caller A with accounting to arrange financing, or the like. Likewise, after financing has been arranged, accounting may again instruct the call control node to connect caller A to a program manager who sets up initiation and orientation sessions. All of the above is handled transparently and without inconvenience to caller A while requiring a minimum of input from the service subscriber.

VSP to IP

FIG. 7a shows an exemplary mid-call sequence where the VSP 208 serves as the call control node and the selected calls are routed to the VSP 208 using a routeset associated with the EISUP trunks 212. Following the call setup as described above with relation to FIGS. 6a and 6b, the IP 214 determines by analyzing DMTF tones, for example, that the user wishes to speak to a sales representative of a subscriber. IP 214 therefore formulates a data message which it dispatches over data line 218 connected to data network 226. The data network 226 forwards the data message over data connection 228 to the VSP 208. The message contains a call identification serial number as described above which the VSP 208 uses to identify the call in the call control table. On receipt of the message, the VSP 208 locates the call in the call control table and using data from the table assembles an ISUP REL message which it dispatches to SP 36 to release the call connected to the terminating end of the EISUP 212 at SP 36 on CIC 18. This causes the SP 36 to generate an RLC message which it returns to the VSP 208. The VSP 208 captures the message and consults the common channel signaling control table which indicates that the message should not be passed back to SP 34 as that would not be expected and create an error condition. The SP 36 also formulates and sends an ISDN release trunk message to IP 214 which returns an ISDN release confirmed message and the terminating end of the call is thus torn down.

VSP 208 thereafter formulates an IAM message using OPC 001, DPC 002, and CIC 18 derived from the common channel signaling control table with the dialed number being the number passed from IP 214 in the reconnect number field of TCP/IP message 300 (see FIG. 4b). Call setup therefore continues in FIGS. 6a or 6b at the "INS" point and call setup proceeds until conversation ensues between the calling party and a sales representative for the service subscriber. It will be understood by those skilled in the art that unless the sales representative is connected to the SP 36 or the PSTN 202 by an ISDN line, call processing may not be identical to the sequence shown in FIGS. 6a and 6b since the sales representative may have a regular line termination to the SP 36 or may be connected to a PBX or the like. Nonetheless, the call setup is otherwise identical to that shown in FIGS. 6a and 6b except that the ACM and ANM messages are not passed back to SP 34 because the SP 34 would not be expecting such messages.

VSP to IP Using ISUP Loop-Back Trunks

FIG. 7b shows the mid-call routing sequence for an implementation of the invention using ISUP loop-back trunks. As above, it is assumed that the caller A indicates to the IP 214 that he wishes to speak with a sales representative of the service subscriber. The IP 214 therefore formulates a data message which it dispatches over data link 218 to the data network 226. The data network 226 forwards the message over data link 228 to the VSP 208. On receipt of the message, the VSP 208 determines by examining the reconnect number field of the message (FIG. 4b) that it should reroute the call to a new termination. The VSP 208 therefore consults its call control table and determines that the call is a call associated with caller A. The VSP 208 returns a confirmation that the instructions were received and instructs the IP 214 to free resources. In order to release the terminating end of the call, the VSP 208 compiles an ISUP REL message having an OPC of 003 and a DPC of 000 derived from the common channel signaling control table, as described above. In this example, in order to simplify CIC numbering the VSP 208 is assigned two point codes 001 and 003 to permit the outbound and inbound ends of the ISUP loop-back trunks to have the same CIC code. Therefore, the REL message compiled by the VSP 208 having the OPC of 003 and the DPC of 000 includes a CIC of 2 indicating the inbound end of member 1 of the ISUP loop-back trunk group. On receipt of the REL message, the SSP A releases its seizure of CIC 2 in the ISUP loop-back trunk group 234 and compiles a RLC message having an OPC of 000 and a DPC of 003 which it returns to the VSP 208. In order to tear down the balance of the call, the SP 34 then redispatches an ISDN release ISDN trunk message to the IP 214 which returns in response an ISDN release confirmed message to the SP 34. The VSP 208 then compiles an IAM message using the look-up tables described above. Ths IAM has an OPC of 003, a DPC of 000 and a CIC of 2 with a calling number which is the CLID of caller A and the called number which is the number for the sales representative of the service subscriber provided to the VSP 208 by the IP 214 in the reconnect number field, as described above. The IAM is emitted into the common channelling signaling network where it is sent to the SP 34 via the STP pair 204 and establishment of a connection to the called party is effected in much the same way as shown at the "INS" of FIG. 6c, with the exception that the called party may not necessarily subscribe to ISDN, as explained above. Again, the ACN and ANM messages are not passed back from the VSP 208 to the SP 34.

ISTP to IP

FIG. 7c shows a mid-call sequence for the call setup sequences shown in FIGS. 6d and 6e where the call control node is an ISTP 232. In this instance, the IP 214 on receiving an indication from the caller A compiles a data message which it transmits over data link 218 to the data network 226. The data network 226 forwards the data message over data link 228 to the ISTP 232. On receipt of the data message, the ISTP 232 consults its call control table and determines that the data message relates to the call in progress from caller A. The ISTP 232 therefore uses the call control node look-up tables to formulate an ISUP REL message having an OPC of 000, a DPC of 002 and a CIC of 14. The REL message is transmitted over the A-links 206 to the SP 36 which responds with an ISUP RLC message having an OPC of 002, DPC of 000 and a CIC of 14. The ISTP 232 does not forward the RLC onto SP 34, as it would during normal call processing. Rather, it discards the message as instructed by an entry in the common channel signaling control table. The SP 36 also dispatches an ISDN release ISDN trunk message to the IP 214 and receives in reply a release confirmed message from the IP 214. The ISTP 232 again uses the call control node look-up tables to formulate an IAM message having an OPC of 000, a DPC of 002, a CIC of 14, a calling number of the CLID from the call control table and a dialed number from the reconnect number supplied by IP 214. It transfers that message over A-links 206 to the SP 36 which initiates call setup to the service subscriber's sales representative in much the same sequence as shown in FIGS. 6d and 6e commencing at the "INS" symbol. In the same manner as explained above, the ACM and ANM are not passed back by the ISTP 214 to the SP 34.

As explained above, the subscriber's sales representative may have a connection to the Internet or some other data network 226 which would permit them to release their end of the call if the caller A required further service which could best be provided by another member of their organization or some other organization.

After all of the needs of caller A are satisfied, the call goes into a final release sequence shown, for example, in FIG. 8.

The final release sequence may be initiated by any one of at least three initiators: a release command received from IP 214 in response to input from caller A; a disconnect initiated by caller A going on-hook; or, by a party to which the call was transferred sending a data release message to the call control node or going on-hook. In FIG. 8, the call control node illustrated is a VSP 208. It will be understood by those skilled in the art that the same release sequence applies to ISTP 232.

In the sequence illustrated in FIG. 8, it is assumed that caller A indicates to IP 214 that they would like to disconnect rather than be transferred to sales, for example. On receipt of the indication, the IP 214 formulates a data message which it dispatches over data connection 218 to the data network 226. The data network 226 forwards the message over data link 228 to the VSP 208. On receipt of the disconnect request, the VSP 208 formulates a REL message having a DPC of 000 and an OPC of 001 with a CIC of the call circuit which it extracts from the common channel signaling control table and dispatches the message to the SP 34. It then formulates a release message having an OPC of 001, a DPC of 002 and the CIC of the call circuit derived from the same table and forwards the message to SP 36. On receipt of the REL message, SP 34 releases the EISUP trunk member indicated by the CIC and applies dial tone to the party line 27. Party line 27 goes on-hook and the SP 34 sends a RLC message having an OPC of 000 and a DPC of 001 with a CIC of the call circuit back to VSP 208. SP 36 returns a similar message after receiving an ISDN disconnect signal from the IP 214. It then returns an ISDN release acknowledgement to the IP 214 which frees all resources. Similar terminating release sequences are used for all call control nodes and all release initiators, as will be well understood by those skilled in the art.

Complex Network Considerations

As will be appreciated, the network configurations described above are simple configurations in which EISUP trunk groups are provided between only one pair of switches. In most implementations, situations may exist where EISUP trunks are provisioned between a plurality of adjacent switches. Those skilled in the art will understand that this complicates decision-making in the call control node because a particular OPC will not necessarily be indicative of the EISUP trunk seized for any particular call. In terms of simplicity of provisioning and conditioning the network, exclusive use of loop-back trunk groups is the least complicated implementation scheme. If EISUP trunk groups are used, there are, however, provisioning methods which permit reliable and efficient use of the invention within the PSTN. For example, where several EISUP trunk groups terminate on a single switch, CIC codes for each member of each trunk group must be assigned uniquely and those unique assignments must carry through to the terminating end of each EISUP. While this is a provisioning consideration, it does not present a provisioning problem. It will also be understood by those skilled in the art that under certain circumstances it may be advantageous to designate a given switch as a Point of Presence (POP) in the network for the routing of selected calls in accordance with the invention in order to simplify network conditioning and provisioning.

Changes and modifications to the novel apparatus and methods for call processing described above may well be apparent to those skilled in the art. The scope of the invention is therefore intended to be limited solely by the scope of the appended claims.

We claim:

1. A method of dynamically routing selected calls through an intelligent switched telephone network using common channel signaling messages generated by a call control node in the common channel signaling control path for the call, comprising the steps of:

a) routing a call through the network to a first termination in response to a number dialed by a calling party so that the common channel signaling path for the call passes through the call control node;

b) receiving at the call control node an indication that a predetermined criteria related to the call has been met;

c) determining at the call control node a new termination for the call indicated directly or indirectly by the predefined criteria;

d) initiating a release of the first termination using at least one common channel signaling message generated by the call control node without releasing the calling party;

e) initiating the rerouting of the call to the new termination using at least one common channel signaling message generated by the call control node; and f) repeating steps b)–e) until the call is terminated.

2. A method of dynamically routing selected calls through an intelligent switched telephone network as claimed in claim 1 wherein the call control node is a virtual switching point comprising:

a common channel signaling interface for receiving and sending common channel signaling messages;

means for examining common channel signaling messages and transparently passing selected common channel signaling messages to an adjacent signaling node;

means for generating common channel signaling messages in response to predetermined criteria; and means for tracking individual calls virtually switched therethrough.

3. A method of dynamically routing selected calls through an intelligent switched telephone network as claimed in claim 2 wherein the virtual switching point further comprises:

a data interface for receiving data inputs from a data network other than the common channel signaling network of the switched telephone network.

4. A method of dynamically routing selected calls through an intelligent switched telephone network as claimed in claim 3 wherein the data inputs are call tracking messages.

5. A method of dynamically routing selected calls through an intelligent switched telephone network as claimed in claim 3 wherein the data inputs are call control messages.

6. A method of dynamically routing selected calls through an intelligent switched telephone network as claimed in claim 2 wherein the virtual switching point further comprises:

means for translating dialed numbers into call routing information.

7. A method of dynamically routing selected calls through an intelligent switched telephone network as claimed in claim 4 wherein the means for translating is enabled to translate dialed digits into call routing information based on a value of at least one predefined variable.

8. A method of dynamically routing selected calls through an intelligent switched telephone network as claimed in claim 7 wherein the at least one predefined variable includes time of day and day of week.

9. A method of dynamically routing selected calls through an intelligent switched telephone network as claimed in claim 1 wherein the network node is an Intelligent Signal Transfer Point (ISTP).

10. A method of dynamically routing selected calls through an intelligent switched telephone network as claimed in claim 1 wherein the call control node is a virtual switching point and the selected calls are routed so that the common channel signaling control path passes through the virtual switching point by:

designating at least one trunk connected to at least one switching node in the switched telephone network as a trunk group to which the selected calls are routed;

creating routing table entries in the at least one switching node to route the selected calls to the at least one trunk group; and creating a linkset and routeset so that common channel signaling messages related to calls routed to the at least one trunk group are routed to the virtual switching point.

11. A method of dynamically routing selected calls through an intelligent switched telephone network as claimed in claim 10 wherein the at least one trunk is a loop-back trunk having an outbound end and a inbound end respectively connected to a trunk side of the at least one network switching node.

12. A method of dynamically routing selected calls through an intelligent switched telephone network as claimed in claim 11 wherein the outbound end and the inbound end are respectively assigned sequential circuit identification codes.

13. A method of dynamically routing selected calls through an intelligent switched telephone network as claimed in claim 10 wherein the at least one trunk is an inter-switch trunk.

14. A method of dynamically routing selected calls through an intelligent switched telephone network as claimed in claim 1 wherein the selected calls are routed based on dialed digits.

15. A method of dynamically routing selected calls through an intelligent switched telephone network as claimed in claim 14 wherein the dialed digits are translated at a Service Control Point before routing occurs.

16. A method of dynamically routing selected calls through an intelligent switched telephone network as claimed in claim 1 wherein the selected calls are routed based on calling line identification.

17. A method of dynamically routing selected calls through an intelligent switched telephone network as claimed in claim 1 wherein the selected calls are routed based on calling line identification and dialed digits.

18. A method of dynamically routing selected calls through an intelligent switched telephone network as claimed in claim 1 wherein the call control node passes only selected common channel signaling messages back towards an originating end of a call until the call is disconnected.

19. A method of dynamically routing selected calls through an intelligent switched telephone network as claimed in claim 18 wherein the common channel signaling messages are Signaling System 7 (SS7) ISDN User Part (ISUP) messages.

20. A method of dynamically routing selected calls through an intelligent switched telephone network as claimed in claim 18 wherein the selected common channel signaling messages comprise Initial Address Message (IAM). Address Complete Message (ACM), Answer Message (ANM) Release (REL) and Release Complete (RLC) messages.

21. An apparatus for dynamically routing selected calls through an intelligent switched telephone network comprising:

a common channel signaling interface for receiving messages from and sending messages to a common channel signaling network, the common channel signaling interface being assigned a service switching point code so that the apparatus appears in the switched telephone network as a switching point (SP);

a memory for storing at least one of the common channel signaling messages;

a memory for storing programs enabling a processor to examine common channel signaling messages received at the common channel signaling interface, generate common channel signaling messages for controlling call connections, tracking calls virtually routed through the switching point (SP), and assessing predefined criteria to determine an action respecting the control of call connections; and processor means for executing the programs.

22. An apparatus for dynamically routing selected calls through an intelligent switched telephone network as claimed in claim 21 wherein the apparatus further includes a connection to a data network other than the common channel signaling network.

23. An apparatus for dynamically routing selected calls through an intelligent switched telephone network as claimed in claim 22 wherein an Intelligent Peripheral is also connected to the data network and the Intelligent Peripheral exchanges messages over the data network with the apparatus.

24. An apparatus for dynamically routing selected calls through an intelligent switched telephone network as claimed in claim 22 wherein a call center is also connected to the data network and the call center exchanges messages over the data network with the apparatus.

25. An apparatus for dynamically routing selected calls through an intelligent switched telephone network as claimed in claim 21 wherein the programs are further enabled to pass on certain common channel signaling messages received at the common channel signaling interface.

26. An apparatus for dynamically routing selected calls through an intelligent switched telephone network as claimed in claim 25 wherein at least some of the messages passed on are modified before they are re-emitted into the common channel signaling network.

27. An apparatus for dynamically routing selected calls through an intelligent switched telephone network as claimed in claim 26 wherein the messages that are modified are modified only to an extent that the Originating Point Code and the Destination Point Code is changed to appear logically correct at a node that is a recipient of the message.

28. A system for dynamically routing selected calls through an intelligent switched telephone network, comprising:

a call control node in a common channel signaling network of the intelligent switched telephone network;

means for routing selected calls so that a common channel signaling control path for the selected calls passes through the call control node;

an Intelligent Peripheral (IP) connected to the intelligent switched telephone network, the IP being adapted to respond to caller inputs from the selected calls; and a data connection that links the call control node and the IP, whereby when a common channel signaling path for one of the selected calls is completed through the call control node and the call is terminated at the IP, the IP is enabled to collect inputs from a calling party and pass data over the data connection to the call control node to permit the call control node to release the call in a forward direction and to reconnect the call to a new termination specified by the data without releasing the calling party.

29. A system for dynamically routing selected calls through an intelligent switched telephone network as claimed in claim 28 wherein the IP is an Interactive Voice Response unit.

30. A system for dynamically routing selected calls through an intelligent switched telephone network as claimed in claim 28 wherein the call control node is a virtual switching point in the network.

31. A system for dynamically routing selected calls through an intelligent switched telephone network as claimed in claim 28 wherein the call control node is an Intelligent Signal Transfer Point (ISTP).

32. A system for dynamically routing selected calls through an intelligent switched telephone network as claimed in claim 30 wherein the means for routing selected calls so that a common channel signaling control path for the selected calls passes through the network comprises:

at least one trunk connected on at least one end to a switching node in the network, the at least one trunk being designated as a trunk group to which the selected calls are routed in that switching node;

creating routing table entries in the switching node to route the selected calls to the at least one trunk group; and creating a linkset and routeset so that common channel signaling messages for calls routed to the at least one trunk group are routed to the virtual switching point.

33. A system for dynamically routing selected calls through an intelligent switched telephone network as claimed in claim 31 wherein the means for routing selected calls so that a common channel signaling control path for the selected calls passes through the network comprises conditioning an ISTP in the common channel signaling control path for the selected calls to release the call in a forward direction and to reconnect the call to a new termination specified by data received from the IVR without releasing the calling party when such data is received at the ISTP.

34. A system for dynamically routing selected calls through an intelligent switched telephone network, comprising:

means for establishing a first termination for the call so that a signaling control path for the call passes through a call control node;

means for releasing the call in a forward direction from the call control node and for reconnecting the call to a new termination specified by data from an external source without releasing a calling party associated with the call.

35. A system for dynamically routing selected calls through an intelligent switched telephone network as claimed in claim 34 wherein the means for establishing the first termination for the call comprises:

at least one trunk in at least one trunk group designated for routing the selected calls and an associated routeset which routes common channel signaling messages associated with the at least one trunk to the call control node.

36. A system for dynamically routing selected calls through an intelligent switched telephone network as claimed in claim 35 wherein the call control node is a virtual node in the switching plane of the network and a physical node in a common channel signaling plane of the network.

37. A system for dynamically routing selected calls through an intelligent switched telephone network as claimed in claim 35 wherein the at least one trunk is a loop-back trunk connected to the trunk side of a switching node in the network.

38. A system for dynamically routing selected calls through an intelligent switched telephone network as claimed in claim 36 wherein the at least one trunk is a loop-back trunk connected to a trunk side of a switching node in the network.

39. A system for dynamically routing selected calls through an intelligent switched telephone network as claimed in claim 37 wherein the at least one trunk is an inter-switch ISUP trunk in the network.

40. A system for dynamically routing selected calls through an intelligent switched telephone network as claimed in claim 39 wherein the data network is the Internet.

41. A system for dynamically routing selected calls through an intelligent switched telephone network as claimed in claim 39 wherein the data is supplied by a called party at the call termination.

42. A system for dynamically routing selected calls through an intelligent switched telephone network as claimed in claim 39 wherein the data is supplied by the calling party which interacts with a machine connected to the data network.

43. A system for dynamically routing selected calls through an intelligent switched telephone network as claimed in claim 42 wherein the calling party interacts with the machine through the call connection.

44. A system for dynamically routing selected calls through an intelligent switched telephone network as claimed in claim 43 wherein the calling party interacts with the machine using DTMF.

45. A system for dynamically routing selected calls through an intelligent switched telephone network as claimed in claim 43 wherein the calling party interacts with the machine using voice commands.

46. A system for dynamically routing selected calls through an intelligent switched telephone network as claimed in claim 34 wherein the means for releasing the call in a forward direction from the call control node comprises common channel signaling messages generated by the call control node.

47. A system for dynamically routing selected calls through an intelligent switched telephone network as claimed in claim 46 wherein the common channel signaling messages are SS7 ISDN User Part (ISUP) messages.

48. A system for dynamically routing selected calls through an intelligent switched telephone network as claimed in claim 34 wherein the call control node is a virtual switching point (VSP) that is assigned a switching node point code.

49. A system for dynamically routing selected calls through an intelligent switched telephone network as claimed in claim 34 wherein the call control node is an Intelligent Signaling Transfer Point (ISTP).

50. A system for dynamically routing selected calls through an intelligent switched telephone network as claimed in claim 48 wherein the VSP is enabled to perform queries to a Service Control Point (SCP) if a ported number requires translation.

51. A system for dynamically routing selected calls through an intelligent switched telephone network as claimed in claim 48 wherein the ISTP is enabled to perform queries to a Service Control Point (SCP) if a ported number requires translation.

52. A system for dynamically routing selected calls through an intelligent switched telephone network as claimed in claim 50 wherein the VSP performs queries to the SCP using SS7 Transaction Capabilities Application Part (TCAP) messages.

53. A system for dynamically routing selected calls through an intelligent switched telephone network as claimed in claim 51 wherein the ISTP performs queries to the SCP using SS7 Transaction Capabilities Application Part (TCAP) messages.

54. A system for dynamically routing selected calls through an intelligent switched telephone network as claimed in claim 50 wherein the VSP uses a data network to perform queries to the SCP.

55. A system for dynamically routing selected calls through an intelligent switched telephone network as claimed in claim 51 wherein the ISTP uses a data network to perform queries to the SCP.

56. A system for dynamically routing selected calls through an intelligent switched telephone network as claimed in claim 38 wherein the VSP compiles call records into billing records for billing the selected calls to a service subscriber.

* * * * *